(12) United States Patent
Dubey et al.

(10) Patent No.: US 11,714,531 B2
(45) Date of Patent: Aug. 1, 2023

(54) GLYPH-AWARE TEXT SELECTION

(71) Applicant: Adobe Inc., San Jose, CA (US)

(72) Inventors: Rohit Kumar Dubey, Rajasthan (IN); Aman Arora, Delhi (IN)

(73) Assignee: Adobe Inc., San Jose, CA (US)

( * ) Notice: Subject to any disclaimer, the term of this patent is extended or adjusted under 35 U.S.C. 154(b) by 32 days.

(21) Appl. No.: 16/808,105

(22) Filed: Mar. 3, 2020

(65) Prior Publication Data

US 2021/0278958 A1 Sep. 9, 2021

(51) Int. Cl.
| | | |
|---|---|---|
| G06F 3/00 | (2006.01) | |
| G06F 9/00 | (2006.01) | |
| G06F 17/00 | (2019.01) | |
| G06F 3/04842 | (2022.01) | |
| G06F 16/903 | (2019.01) | |
| G06F 3/0481 | (2022.01) | |

(52) U.S. Cl.
CPC ........ *G06F 3/04842* (2013.01); *G06F 3/0481* (2013.01); *G06F 16/903* (2019.01)

(58) Field of Classification Search
CPC ... G06F 3/04842; G06F 16/903; G06F 3/0481
See application file for complete search history.

(56) References Cited

U.S. PATENT DOCUMENTS

| | | | | |
|---|---|---|---|---|
| 6,501,475 B1* | 12/2002 | Cheng | ............... | G06T 11/203 345/467 |
| 7,046,848 B1* | 5/2006 | Olcott | ............ | G06K 9/00442 382/176 |
| 7,170,528 B1* | 1/2007 | Chater | ............... | G06T 11/20 345/467 |
| 7,639,258 B1* | 12/2009 | Dowling | ............ | G06T 11/203 345/469 |
| 2008/0238927 A1* | 10/2008 | Mansfield | ............ | G06T 11/60 345/467 |
| 2013/0124978 A1* | 5/2013 | Horns | ............... | G06F 40/169 715/243 |
| 2016/0041738 A1* | 2/2016 | Lal | ................. | G06F 3/0237 715/771 |
| 2018/0218523 A1* | 8/2018 | Dhanuka | ............. | G06T 3/403 |
| 2019/0188887 A1* | 6/2019 | Aggarwal | ............ | G06T 11/60 |
| 2019/0317980 A1* | 10/2019 | Dhanuka | ............. | G06F 40/166 |

* cited by examiner

*Primary Examiner* — Kieu D Vu
*Assistant Examiner* — Anita D Chaudhuri
(74) *Attorney, Agent, or Firm* — Nicholson De Vos Webster & Elliott LLP

(57) ABSTRACT

Techniques and systems are provided for glyph-aware text selection. For instance, a glyph selection system can detect that a user has selected a glyph within a user interface. The glyph selection system can highlight the glyph and/or a region encompassing the glyph to communicate, to the user, that the glyph is selected. This highlighted region can be determined based on the shape and/or outline of the glyph. For example, the glyph selection system can determine bounds (e.g. coordinates) of the glyph in order to highlight a region within the user interface that fully encompasses the glyph and does not include portions of unselected glyphs. In some cases, the highlighted region may be rectangular. Alternatively, the highlighted region may be non-rectangular, such as a border defined by the outline of the glyph.

18 Claims, 21 Drawing Sheets

GLYPH-AWARE TEXT SELECTION

FIELD

This application is generally related to glyph-aware text selection solutions. For example, aspects of this application relate to highlighting selected glyphs within a user interface based on the shape or outline of the glyphs.

BACKGROUND

Glyph selection (also referred to as "text selection") is a task of visually indicating text, images, or other content within a user interface that has been selected by a user. For instance, while creating or editing a document within an application, a user can select one or more elements of the document on which to perform an action (such as changing the size or color of the elements). These types of selections can be performed via a variety of user inputs, such as by the user holding down one button of a mouse and then dragging a text cursor over the elements to be selected. In response to detecting this input, a glyph selection system indicates or demonstrates the user's selection. For example, the glyph selection system may attempt to highlight a region surrounding or including the selection. The highlighted region represents incidental feedback designed to communicate, to the user, which elements have been selected. In this way, the highlighted region may enable the user to know whether they have accurately selected the elements they intended to select.

Some selectable elements within a user interface (such as letters, characters, and images) correspond to or can be referred to as glyphs. Many solutions to glyph selection are limited by the accuracy with which they can localize glyphs within a user interface. For instance, a glyph selection solution may detect that one or more glyphs are selected and then highlight a region that approximately encompasses all or a portion of the glyphs. The bounds or dimensions of this highlighted region may be at least partially selected based on a width of a text line (or other logical division) in which the glyphs reside. However, the bounds of the glyphs may not correspond to the bounds of the text line. For instance, a glyph may extend into another text line, or an unselected glyph may extend into the text line of the selected glyph. As a result, the glyph selection solution may fail to highlight the entirety of the selected glyph, or may highlight all or a portion of an unselected glyph, creating confusion and frustration for the user. Because the user is unaware of or misinformed about which glyphs are actually selected, the user may be required to edit a portion of a document multiple times before the correct glyphs are selected. Further, some glyph selection solutions alter (e.g., invert) the color of a glyph when highlighting the glyph, preventing the user from accurately visualizing changes to the color of the glyph while the glyph is selected. These deficiencies of glyph selection solutions may be exacerbated by uncommon or unusual glyphs, such as text written in decorative fonts or groups of letters with various sizes or offsets.

Techniques and systems are needed for providing a glyph selection solution that precisely and unambiguously highlights content that has been selected within a user interface.

SUMMARY

Glyph selection systems and related techniques are described herein that perform glyph-aware text selection. For instance, a glyph selection system can detect that a user has selected a glyph within a user interface. The glyph selection system can highlight the glyph (or a region encompassing the glyph) to communicate, to the user, that the glyph is selected. This highlighted region can be determined based on the shape and/or outline of the glyph. For example, the glyph selection system can utilize bounds (e.g. coordinates) of the glyph in order to highlight a region within the user interface that fully encompasses the glyph and does not include portions of unselected glyphs. In some cases, the highlighted region may be rectangular. In other cases, the highlighted region may be non-rectangular, such as a border defined by the outline of the glyph.

Additional features and advantages of the present application will be set forth in the description which follows, and in part will be obvious from the description, or may be learned by the practice of the examples provided herein.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing.

DETAILED DESCRIPTION

Figure 1A:
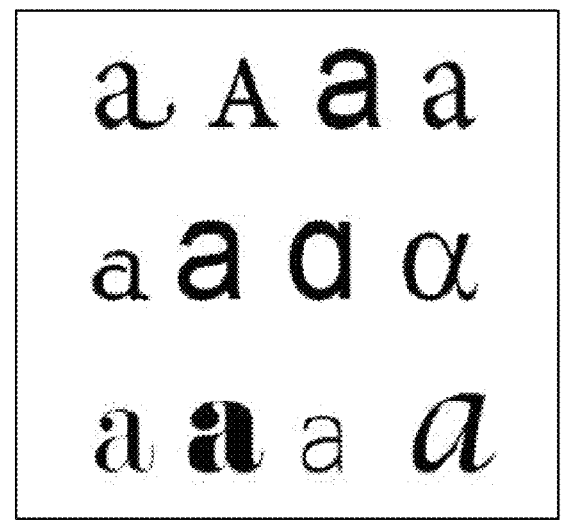
FIG. 1A and FIG. 1B are illustrations of examples of glyphs, in accordance with some examples provided herein.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A glyph-aware text selection system and related techniques are provided herein, which provide benefits and solve one or more problems related to glyph selection approaches. Glyph selection is a task of visually indicating text, images, or other content within a user interface that have been selected by a user. For example, while creating or editing a document (via an application such as a word processor or an image manipulator), a user can select one or more elements within the document on which to perform an action. As an example, a user can select a portion of text (or other glyph) by providing a selection input, which can cause a command to be provided to an application. The command can prompt the application to change the font type or color of the selected text. These types of selections can be performed based on a variety of selection inputs. In one illustrative example, a user can hold down or press one button of a mouse and can drag a text cursor over the text elements to be selected. In another illustrative example, a user can select text or other character(s) using a touch input (e.g., by touching a touch interface with one or more fingers, with an electronic selection pen, or using other touch input). Other selection inputs can be based on detected eye gaze, a detected gesture, a detected verbal command, among others. In response to detecting a selection input, a glyph selection system indicates or demonstrates the user's selection of one or more elements. For example, the glyph selection system may attempt to highlight (or otherwise alter) a region surrounding or including the selection of the one or more elements. The highlighted region represents incidental feedback designed to communicate, to the user, which elements have been selected. In this way, the highlighted region may enable the user to know whether they have accurately selected the elements they intended to select.

As will be explained in detail below, the disclosed glyph-aware text selection approach determines a portion of a user interface to be highlighted based on the shape or outline of the glyphs selected by a user. The term "glyph," as used herein, can refer to any type or form of character, symbol, and/or image rendered in a user interface. Examples of glyphs include letters, numbers, pictures, diacritics, pictographs, hieroglyphics, graphemes, additional elements of written language, and the like. Some glyphs represent or portray a semantic meaning (such as a letter, word, or emotion). Alternatively, a glyph can be decorative. For example, the glyph may serve an aesthetic function in addition to or instead of representing a semantic meaning.

Glyphs can vary greatly in size, shape, format, and/or position within a user interface. Unfortunately, some solutions for glyph selection are unable to adequately account for or handle this variation. For example, a glyph selection solution may highlight a region that inaccurately indicates the glyph currently selected by a user. As a result, the user viewing the highlighted region is unaware of or misinformed about which glyphs will be altered (e.g., changed in style or format) by an action performed by the user. Thus, the action may be applied to glyphs not intended to be selected by the user, or the action may be applied to fewer glyphs than intended to be selected by the user.

Some errors in glyph selection can be described or classified with various labels and/or categories. For example, a glyph selection error corresponding to a highlighted region that includes less than the entirety of a selected glyph can be referred to as an underselection. A glyph selection error corresponding to a highlighted region that includes all or a portion of an unselected glyph can be referred to as an overselection. In addition, a glyph selection error corresponding to a highlighted region that does not include any portion of a selected glyph can be referred to as an erroneous selection. In some cases, a glyph selection solution can simultaneously produce two or more different types of errors. For example, it is possible for a glyph selection solution to underselect one portion of a glyph while overselecting a different portion of the glyph.

Some types of glyphs present especially difficult challenges for glyph selection solutions. For example, glyph selection solutions often fail to accurately select fonts or typefaces with pronounced, unusual, or uncommon characteristics, such as discretionary ligatures or large ascents or descents. Glyphs with some stylistic or formatting features (such as skewed or italicized characters, drop caps, baseline shifts, mixed fonts, and the like) also present challenges to some glyph selection solutions. Further, some glyph selection solutions are unable to accurately highlight non-Roman glyph sets, such as glyph sets including Japanese or Arabic characters.

In some cases, inaccurate glyph selection is the result of the technique by which a glyph selection solution identifies the position of a glyph within a user interface. For instance, some glyph selection solutions select the bounds or dimensions of a region encompassing a glyph based at least in part on a width of a text line (or other logical division) in which the glyph resides. As an example, an application may divide a user interface into strips that each correspond to a line of text (or other glyph). Each of these strips can be referred to as a waxline. Some traditional glyph selection solutions use information about the structure of a waxline to define the bounds of a region to be highlighted. However, this information is often insufficient for precise and accurate glyph selection. For example, an application can maintain a data structure (e.g., a structure referred to as a waxglyph) that stores information about the glyphs within a waxline. Specifically, the data structure may store the height (e.g., vertical bounds) of the waxline and/or the horizontal position of the glyphs within the waxline (e.g., points at which one or more glyphs intersect or touch a horizontal axis of the waxline). In response to detecting that a user selects a glyph within the waxline, a glyph selection solution may use the information within the data structure to determine a region that at least partially encompasses the glyph. For instance, the glyph selection solution can set the vertical bounds of the region to match the vertical bounds of the waxline, and set the horizontal bounds of the region to match the horizontal intersection points of the glyph. Unfortunately, determining the region in this manner may result in one or more glyph selection errors. For example, the glyph selection solution may underselect the selected glyph if the selected glyph extends beyond the bounds of the waxline, or the glyph selection solution may overselect an unselected glyph that resides in an adjacent waxline (e.g., if the unselected glyph extends into the waxline of the selected glyph).

Some glyph selection solutions can generate additional types of errors or inaccuracies. For example, the highlighting technique implemented by a glyph selection solution can undesirably alter the color of a selected glyph. Such an error may occur if a glyph selection solution highlights glyphs by inverting or otherwise changing their color. In addition to being visually unappealing, this color change can hinder the user's ability to edit or interact with a document that includes the images. For example, if the user selected the images in order to change their color, the highlighting technique can prevent the user from assessing the result of the color change while the images are selected. Moreover, highlighting a set of glyphs can obscure some functions or features of the glyphs. For example, altering the color of text including a hyperlink can prevent the hyperlink from being visible or obvious to the user.

In general, inaccurate glyph selection can lead to slow and tedious interactions between users and applications. If a user is unable to determine which glyphs are currently selected, the user may be required to edit and re-edit a document multiple times before the correct glyphs are selected. Further, some cognitive disabilities (such as dyslexia) may be exacerbated by ambiguously highlighted regions and/or inverted color schemes. Improved glyph selection systems can facilitate accurate and seamless interactions with applications, as well as provide comfortable working environments for users with cognitive disabilities. In turn, these features can improve the reputation and profitability of the applications.

The glyph-aware text selection systems and related techniques described herein provide solutions for accurately and efficiently highlighting selected glyphs. For instance, a glyph-aware text selection solution is described that can determine a region that encompasses a selected glyph based on the shape or outline of the glyph. In response to detecting that a user has selected the glyph, the glyph-aware solution can obtain information defining or corresponding to the outline of the glyph. The information can include coordinates of pixels that form the glyph within the user interface. The coordinates identify the precise position, shape, and orientation of the glyph, as well as accurately reflect formatting options (such as bolded or italicized font) applied to the glyph. The coordinates can be obtained in a variety of ways, such as by querying a model of the application that displays the glyph and/or a server that stores information about glyphs supported by the application.

The glyph-aware systems and techniques can use the coordinates in a variety of ways to define the region that encompasses the glyph. In one approach, the glyph-aware solution can determine a bounding box of the glyph based on the coordinates. The bounding box corresponds to a rectangle defined by the vertical and horizontal bounds of the glyph. As such, the bounding box encompasses the entirety of the glyph (avoiding underselection) and is unlikely to include portions of adjacent glyphs that are not currently selected (avoiding overselection). Once the bounding box is determined, the glyph-aware solution indicates that the glyph is selected by highlighting (or otherwise changing the appearance) of all or a portion of the content within the bounding box. In another approach, the glyph-aware solution can use the coordinates to generate a path (e.g., a set of lines and/or curves) that defines and/or fits the outline of the glyph. In one example, the path includes or represent a Bézier path or other parametric curve. The glyph-aware solution indicates that the glyph is selected by highlighting (or otherwise changing the appearance of) a border (e.g., an extended outline) defined by the path. As with the bounding box approach, this glyph outline approach avoids both underselection and overselection. In addition, the glyph outline approach can avoid altering the original color of the glyph.

When implementing either the bounding box approach or the glyph outline approach, the glyph-aware solution can update the highlighted region as the user continues to select additional glyphs. For example, the glyph-aware solution can extend the highlighted region (or highlight an additional region) in response to detecting that the user selects an additional glyph while the first glyph is still selected. If the glyph-aware solution determines the user is no longer selecting a glyph, the glyph-aware solution can restore the glyph and the corresponding highlighted region to their original states (e.g., original colors).

Figure 1B:
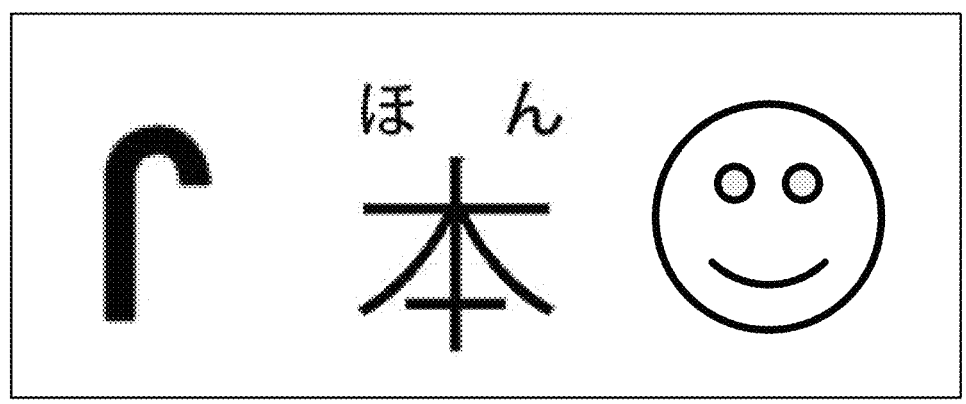

FIG. 1A and FIG. 1B illustrate various example glyphs. Specifically, FIG. 1A illustrates a set of glyphs that each represent the letter "a". As shown in FIG. 1A, these glyphs may be of various fonts, styles, formats, and/or sizes. FIG. 1B illustrates additional types of glyphs, including (from left to right) an Egyptian hieroglyphic, a Japanese character, and an emoji. Some glyph selection solutions may be unable to adequately handle or account for variations in size, shape, format, and/or position of such glyphs, which may result in one or more types of glyph selection errors.

Figure 2A:
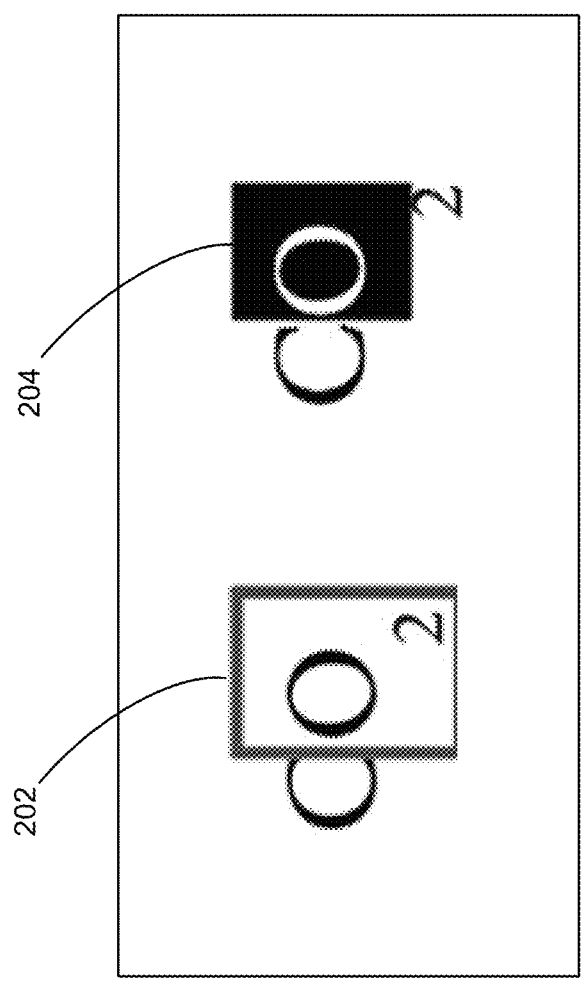
FIG. 2A, FIG. 2B, and FIG. 2C are illustrations of examples of errors generated by some glyph selection solutions, in accordance with some examples provided herein.
Figure 2B:
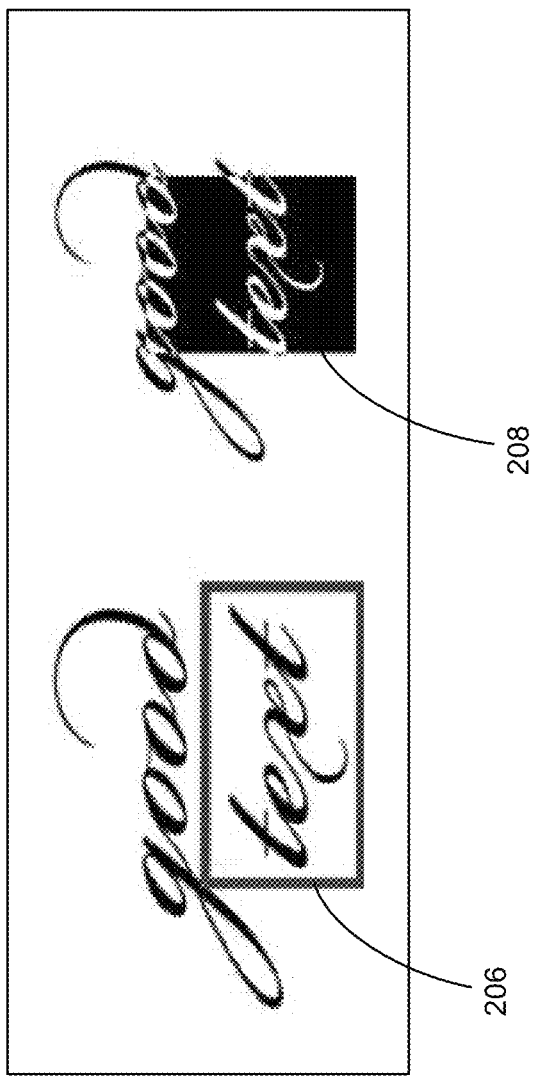
Figure 2C:
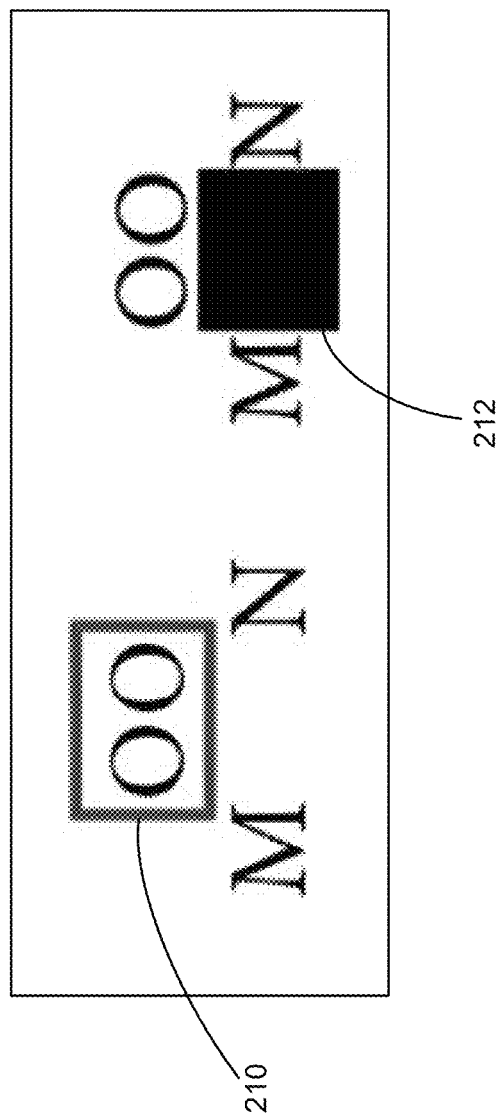

As noted above, a glyph selection error can be classified as an underselection, an overselection, or an erroneous selection. FIG. 2A illustrates an example of underselection. In this example, a user selects a glyph set 202 (corresponding to "O$_2$"). In response to this selection, a glyph selection solution highlights a region 204 (encompassing the "O" within glyph set 202). Although the subscript "2" within the glyph set 202 is selected (and will therefore be affected by actions performed on selected glyphs), the selection is not clearly indicated to the user (e.g., because the glyph selection solution is not capable of highlighting subscripts). Thus, the user may believe that the subscript is not selected. FIG. 2B illustrates an example of overselection. In this example, the user selects a glyph set 206 (corresponding to "text"). In response to this selection, the glyph selection solution highlights a region 208. While the region 208 includes "text," the region 208 also includes letters within the word "good" (e.g., because the glyph selection solution highlights regions of a standard or set height). Thus, the user may believe that all or a portion of the word "good" is selected. FIG. 2C illustrates an example of erroneous selection. In this example, the user selects a glyph set 210 (corresponding to "OO"). In response to this selection, the glyph selection solution highlights a region 212. The region 212 does not include either glyph of the glyph set 210 (e.g., because the glyph selection system is not capable of highlighting text with large baseline shifts). Thus, the user may believe that no glyphs are selected.

Figure 3:
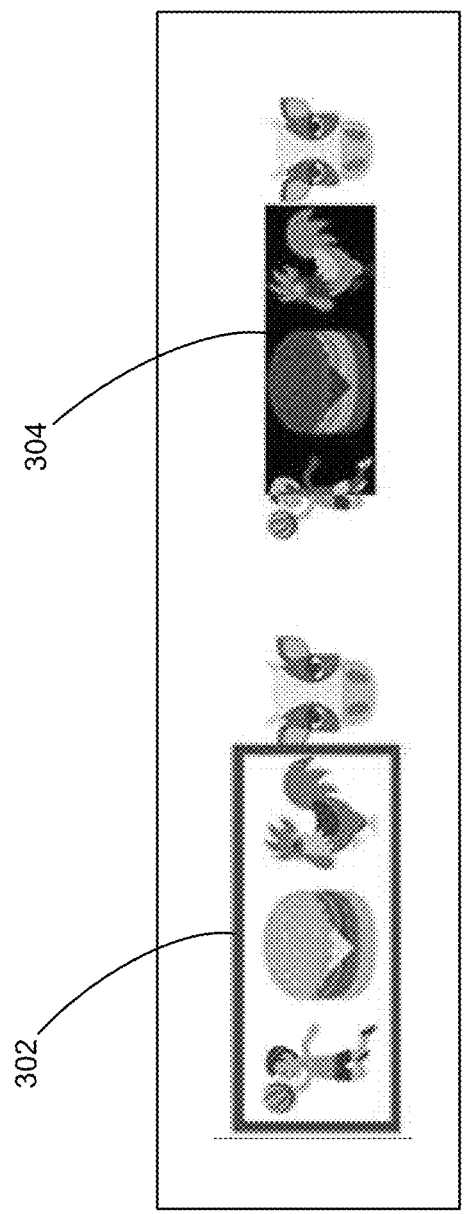
FIG. 3 is an illustration of an example of an error generated by some glyph selection solutions, in accordance with some examples provided herein.

FIG. 3 illustrates an example of a glyph selection error corresponding to undesirably altering the color of a selected glyph. In this example, the user selects a glyph set 302 that includes three images. In response to this selection, a glyph selection solution highlights the images by inverting or otherwise changing colors of the images (resulting in a highlighted region 304). As shown in FIG. 3, the colors of the images within the highlighted region 304 do not accurately represent the colors of the images within the glyph set 302.

Figure 4A:
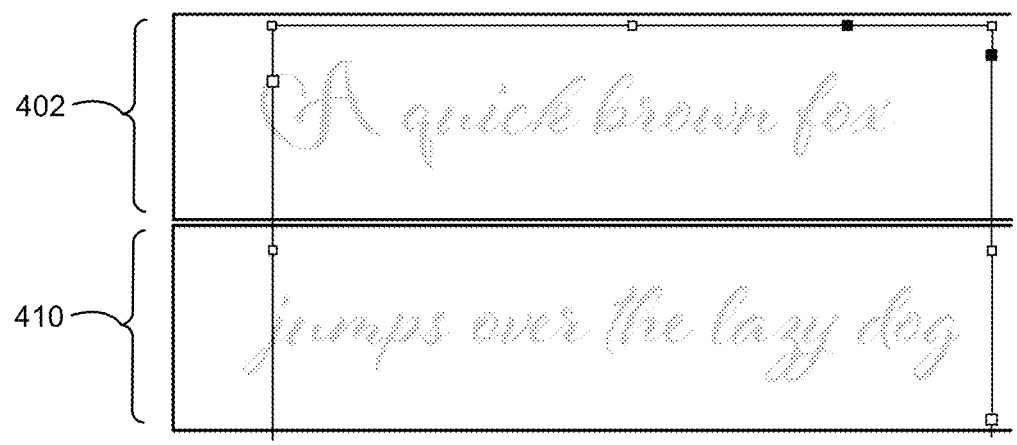
FIG. 4A, FIG. 4B, FIG. 4C, and FIG. 4D are illustrations of example text lines (or waxlines) and highlights generated by a text line (or waxline) based glyph selection solution, in accordance with some examples provided herein.
Figure 4B:
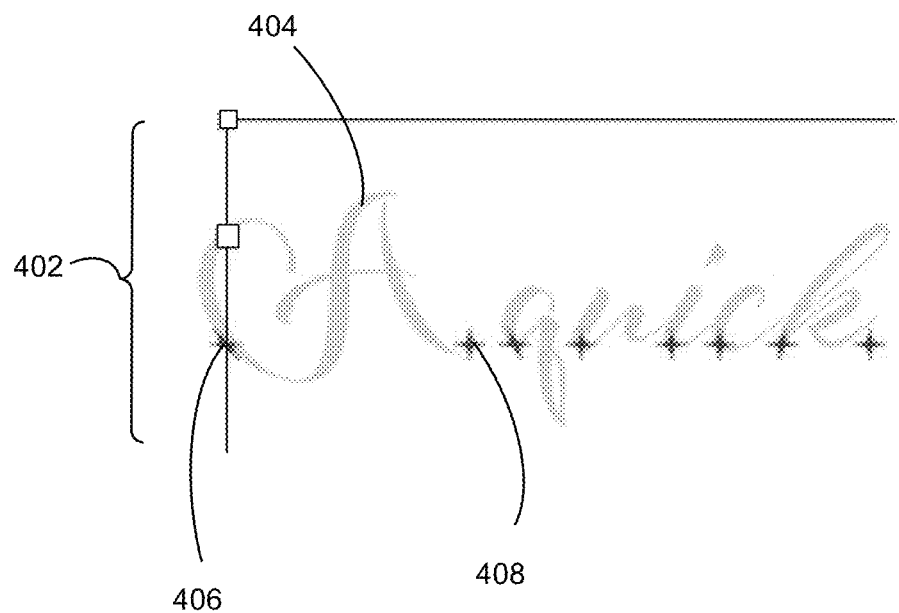

As noted above, some glyph solutions may attempt to highlight a selected glyph based on information about a waxline in which the glyph resides. To illustrate this approach, FIG. 4A includes a waxline 402 and a waxline 410 located below the waxline 402 within a user interface. The waxlines may be the same height, or different heights. Although not illustrated in FIG. 4A, one or more glyphs within the waxline 402 may extend into the waxline 410 and/or one or more glyphs within the waxline 410 may extend into the waxline 402. In some cases, an application can maintain a data structure (e.g., a waxglyph) that stores information about the glyphs within the waxlines 402 and 410. For instance, the data structure can store the height (e.g., vertical bounds) of the waxlines 402 and 410 and/or the horizontal position of glyphs within the waxlines 402 and 410. As an example, the data structure may store the position of a point 406 and a point 408 illustrated in FIG. 4B. In this example, the points 406 and 408 correspond to locations at which a glyph 404 intersects with and/or touches a horizontal axis within the waxline 402. The data structure can store similar information indicating the horizontal position of one or more other glyphs within the waxline 402.

Figure 4C:
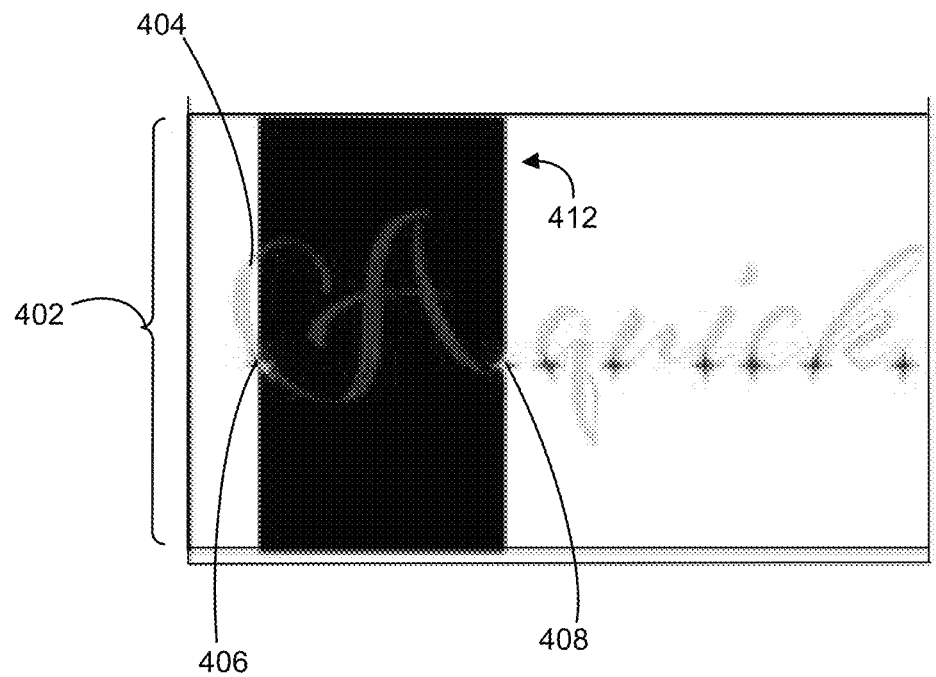
Figure 4D:

In some cases, a glyph selection solution may detect that a user has selected the glyph 404. In response to this detection, the glyph selection solution can highlight a region at least partially encompassing the glyph 404 to indicate that the glyph 404 is selected. A region 412 in FIG. 4C illustrates an example of this region. In this example, the glyph selection solution can determine the vertical bounds of the waxline 402 (e.g., by searching a data structure stored in connection with the waxline 402) and then set the vertical bounds of the region 412 to match and/or correspond to the vertical bounds of the waxline 402. In addition, the glyph selection solution can set the horizontal bounds of the region 412 to match and/or correspond to the points 406 and 408. As shown in FIG. 4C, the region 412 does not fully encompass the glyph 404 (resulting in an underselection error). In addition, the region 412 extends beyond the vertical bounds of the glyph 404 (potentially creating an overselection error). In some cases, the glyph selection solution may detect that the user selects one or more additional glyphs within the waxline 402 and then update the region 412 to encompass these glyphs. As an example, the glyph selection solution can highlight a region 414 illustrated in FIG. 4D in response to detecting that the user selects the word "quick" within the waxline 402. As illustrated in FIG. 4A, FIG. 4B, FIG. 4C, and FIG. 4D, the information stored in connection with waxlines merely indicates the general position of selected glyphs. Thus, a waxline-based solution may only be capable of approximate or rough glyph selection.

Figure 5:
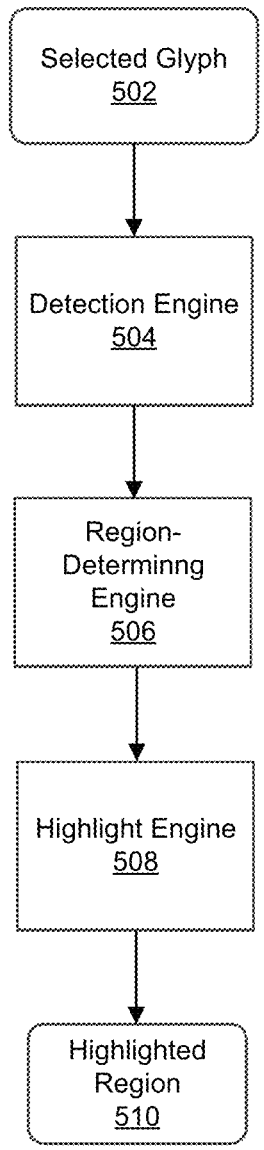
FIG. 5 is a diagram illustrating an example of a glyph-aware glyph selection system, in accordance with some examples provided herein.

FIG. 5 is a diagram illustrating an example of a glyph selection system 500 that can be used to perform the glyph-aware text selection techniques described herein. The glyph selection system 500 includes various components, including a selected glyph 502, a detection engine 504, a region-determining engine 506, a highlight engine 508, and a highlighted region 510. The components of the glyph selection system 500 can include software, hardware, or both. For example, in some implementations, the components of the glyph selection system 500 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the computing device implementing the glyph selection system 500.

While the glyph selection system 500 is shown to include certain components, one of ordinary skill will appreciate that the glyph selection system 500 can include more or fewer components than those shown in FIG. 5. For example, the glyph selection system 500 can include, or can be part of a computing device that includes, one or more input devices and one or more output devices (not shown). In some implementations, the glyph selection system 500 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 5.

As noted above, the glyph selection system 500 can be implemented by and/or included in a computing device. In some cases, multiple computing devices can be used to implement the glyph selection system 500. For example, a computing device used to implement the glyph selection system 500 can include a personal computer, a tablet computer, a mobile device (e.g., a mobile phone or other mobile device), a wearable device (e.g., a smart watch, a virtual reality headset, an augmented reality headset, and/or other wearable device), a server or multiple servers (e.g., in a software as a service (SaaS) system or other server-based system), and/or any other computing device with the resource capabilities to perform the techniques described herein.

In some implementations, the glyph selection system 500 can be integrated with (e.g., integrated into the software, added as one or more plug-ins, included as one or more library functions, or otherwise integrated with) one or more software applications, such as a search engine, a web browser, a design application (e.g., Adobe InDesign™, Adobe Illustrator™, Adobe Acrobat™, Adobe Photoshop™, Adobe After Effects™, among others), or other software application that allows a user (also referred to as an end-user) to select one or more items. The software application can be a mobile application installed on a mobile device (e.g., a mobile phone, such as a smartphone, a tablet computer, a wearable device, or other mobile device), a desktop application installed on a desktop computer, a web-based application that can be accessed using a web browser or other application, or other software application. In some implementations, the glyph selection system 500 can be implemented in a suite of software applications.

In some cases, the selected glyph 502 represents a glyph that is selected by a user within a user interface displayed by an application. The application can enable the user to select glyphs within the user interface via a variety of types of selection input. In some illustrative examples, a user can provide input via a mouse, such as by clicking, double-clicking, and/or holding down or pressing one button of a mouse and dragging a text cursor over at least a threshold percentage (e.g., 50%) of an element to be selected. In another illustrative example, a user can select text or other character(s) using a touch input (e.g., by touching a touch interface with one or more fingers, with an electronic selection pen, or using other touch input). Other selection inputs can be based on detected eye gaze, a detected gesture, a detected verbal command, among others. The detection engine 504 can detect the selected glyph 502 by monitoring the user's input to the user interface and/or by receiving a notification about the selected glyph 502 from the application.

After detecting the selected glyph 502, the detection engine 504 can prompt the region-determining engine 506 to determine a region that encompasses the selected glyph 502 in accordance with either the bounding box approach or the glyph outline approach. To determine the region, the region-determining engine 506 can obtain information defining an outline of the selected glyph 502. For example, the region-determining engine 506 can obtain a set of coordinates that identify all or a portion of the pixels within the user interface that correspond to (e.g., are currently being used to display) the selected glyph 502. In this example, the location of each pixel within the user interface can be mapped to and/or defined by a coordinate pair that includes an x-axis coordinate and a y-axis coordinate within a rectangular coordinate plane. The coordinates identifying the pixels that correspond to the selected glyph 502 can include coordinate pairs corresponding to the entirety of the selected glyph 502, coordinate pairs corresponding to the outline (e.g., the outermost contours) of the selected glyph 502, or coordinate pairs corresponding to any other portion of the selected glyph 502. In some cases, the coordinates accurately reflect attributes such as the precise position, shape, and/or orientation the selected glyph 502. For example, the coordinates can reflect formatting options (such as bolded or italicized font) that have been applied to the selected glyph 502. In addition, the coordinates can reflect the layout or position of the selected glyph 502 in relation to other elements of the user interface (e.g., the coordinates can indicate that the selected glyph 502 resides within a table, is positioned at the end of a paragraph, is adjacent to a hyphen, etc.).

In some cases, the application can support or provide a set of glyphs. Each glyph within the set can be identified by and/or associated with a glyph identifier (e.g., a number or other type of identification information). For example, a unique glyph identifier may be assigned to the letter "a" written in Times New Roman font. In some cases, the region-determining engine 506 can obtain coordinates defining the outline of the selected glyph 502 based on both the glyph identifier of the selected glyph 502 and specific attributes of the selected glyph 502 within the user interface. For example, the region-determining engine 506 can identify (e.g., by accessing an object-oriented model of the application) the glyph identifier and/or attributes such as the font size, format, and position of the selected glyph 502. The region-determining engine 506 can then query a server that stores information about the set of glyphs for the coordinates based on the identified information. In one example, the server is external to a client device that runs the application. In this example, the region-determining engine 506, implemented on the client device, can access the server remotely (e.g., via a network). In another example, the server represents and/or includes a database or portion of memory of the client device and/or the application. In this example, the region-determining engine 506 can access the server directly (e.g., without network communication).

After obtaining the coordinates from the server, the region-determining engine 506 can process and/or transform the coordinates to determine the region encompassing the selected glyph 502. As will be explained in detail below, the manner in which region-determining engine 506 processes and/or transforms the coordinates may depend on the glyph selection approach (e.g., either the bounding box approach or the glyph outline approach) implemented by the glyph selection system 500.

Figure 6:
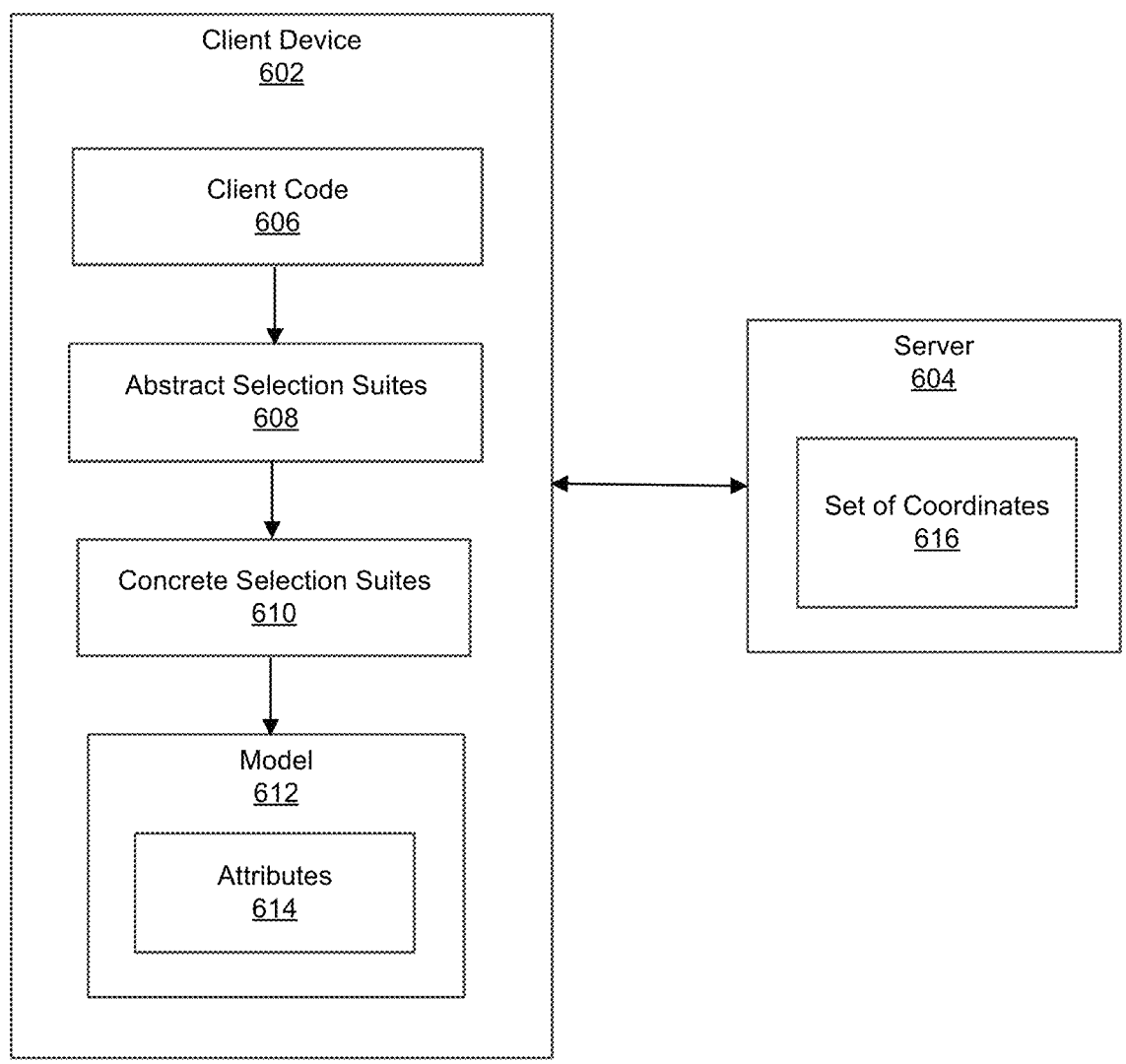
FIG. 6 is a block diagram illustrating an example of a glyph-aware glyph selection system, in accordance with some examples provided herein.

FIG. 6 illustrates a glyph selection system 600 that can be used to perform the glyph-aware text selection techniques described herein. Specifically, the glyph selection system 600 illustrates examples of the devices that may implement the glyph selection system 500. As shown in FIG. 6, the glyph selection system 600 can include a client device 602 in communication with a server 604. The client device 602 and the server 604 may both store and/or implement all or a portion of glyph selection system 500. For example, detection engine 504, region-determining engine 506, and/or highlight engine 508 can be distributed across one or both devices. In one example, the client device 602 corresponds to a computing device running at least a portion of the application that displays the user interface. In this example, the server 604 may correspond to a database and/or portion of memory that stores and/or processes information about glyphs provided or supported by the application. For example, the server 604 may store coordinates 616 that define the shape of all or a portion of the glyphs. In some cases, the client device 602 can be in communication with the server 604 via a network (e.g., a wireless network). Additionally or alternatively, the server 604 may be part of and/or included within the client device 602.

In some cases, the client device 602 executes client code 606. Client code 606 may represent a high-level interface that facilitates performing actions on elements of the user interface displayed to the user. These elements (e.g., glyphs) may be stored and/or accessed within a model 612 maintained by the client device 602. The model 612 can store specific attributes (e.g., attributes 614) of the glyphs currently displayed in the user interface. In one example, the model 612 stores the attributes as objects in accordance with an object-oriented programming language. In some cases, client code 606 may be decoupled (e.g., abstracted) from the model 612. This decoupling may simplify client code 606, as well as enable client code 606 to support and/or handle various selection techniques and formats. However, because of the decoupling, client code 606 may access the model 612 via one or more suites and/or interfaces (instead of accessing the model 612 directly). For example, client code 606 can access the model 612 by interfacing with one or more of abstract selection suites 608 that in turn interface with one or more of concrete selection suites 610. In some examples, the concrete selection suites 610 may be capable of extracting specific attributes (e.g., objects) from the model 612. Abstract selection suites 608 and concrete selection suites 610 suites may represent and/or correspond to application program interfaces that encapsulate communications between various components of a selection system (e.g., in accordance with a façade pattern).

In response to detecting that the user selects the selected glyph 502, client code 606 can facilitate identifying attributes of the selected glyph 502 via abstract selection suites 608 and concrete selection suites 610. For example, client code 606 can identify one of abstract selection suites 608 that is capable of and/or configured to facilitate identifying attributes within the model 612. Client code 606 can then acquire and/or activate the one of abstract selection suites 608 (e.g., by calling one of its methods). The one of abstract selection suites 608 can then identify one of concrete selection suites 610 that targets (e.g., is associated with) the portion of the model 612 that stores attributes about the selected glyph 502. The one of concrete selection suites 610 can identify one or more attributes about the selected glyph 502 within the attributes 614.

After the attributes about the selected glyph 502 are identified, client code 606 (or another component of the client device 602) can forward the attributes and/or a glyph identifier of the selected glyph 502 to the server 604. Based on that information, the server 604 can obtain coordinates defining the outline of the selected glyph 502. For example, the server 604 can identify, within a set of coordinates 616, a subset of coordinates corresponding to the glyph identifier. In some cases, the server 604 can transform the subset of coordinates based on the attributes of the selected glyph 502. For example, the server 604 may multiply the subset of coordinates based on the size (e.g., font size) of the selected glyph 502, and/or skew the subset of coordinates based on the selected glyph 502 being italicized. In some cases, the server 604 may return the transformed subset of coordinates to the client device 602 to facilitate determining a region encompassing the selected glyph 502. In other cases, the server 604 may perform further transformations and/or processes on the subset of coordinates before returning the coordinates to the client device 602. For example, based on the subset of coordinates, the server 604 may determine a bounding box of the selected glyph 502 and/or a path defining the outline of the selected glyph 502. Techniques for determining and using these bounding boxes and paths will be explained in more detail below.

FIG. 7, FIG. 8A, FIG. 8B, FIG. 8C, FIG. 8D, FIG. 8E, and FIG. 8F illustrate the process by which the glyph selection system 500 can perform the bounding box approach. In the bounding box approach, the region-determining engine 506 can determine a region to be highlighted as a rectangle defined by the vertical and horizontal bounds of the selected glyph 502. This rectangle can be defined by an upper vertical bound, a lower vertical bound, a left horizontal bound, and a right horizontal bound. In some cases, the upper vertical bound of the selected glyph 502 corresponds to the maximum y-axis coordinate within the coordinates defining the outline of the selected glyph 502, and the lower vertical bound corresponds to the minimum y-axis coordinate within the coordinates. Similarly, the right horizontal bound of the selected glyph 502 can correspond to the maximum x-axis coordinate within the coordinates and the left horizontal bound can correspond to the minimum x-axis coordinate within the coordinates.

Figure 7:
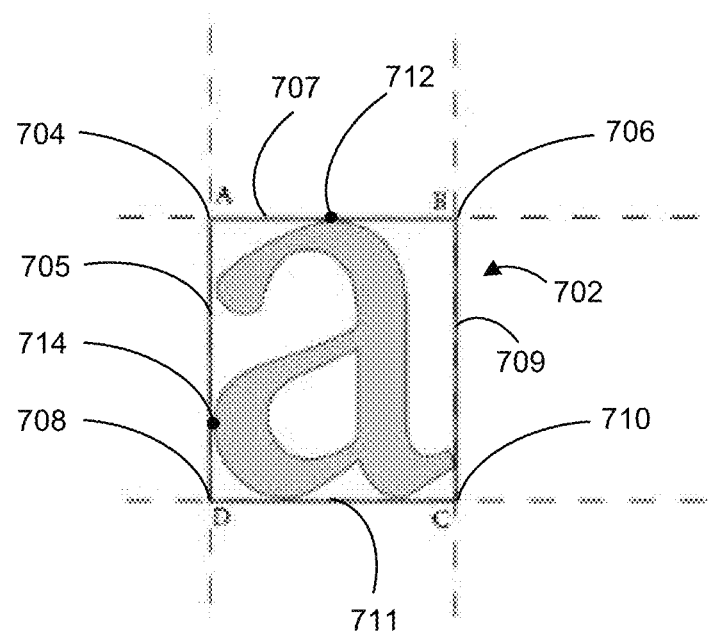
FIG. 7 is an illustration of an example of a bounding box, in accordance with some examples provided herein.

FIG. 7 illustrates an example of a bounding box 702 defined by the vertical and horizontal bounds of a glyph 701 (which represents an embodiment of the selected glyph 502). In this example, the bounding box 702 corresponds to a rectangle with corners at points 704, 706, 708, and 710. As shown in FIG. 7, the perimeter of the bounding box 702 is defined by bounds that connect these points, the bounds including a left horizontal bound 705 of the glyph, an upper vertical bound 707 of the glyph, a right horizontal bound 709 of the glyph, and a lower vertical bound 711 of the glyph. In some cases, the region-determining engine 506 can determine the x-axis coordinate of point 704 as the x-axis coordinate of a point 714 on the glyph. In addition, the region-determining engine 506 can determine the y-axis coordinate of point 704 as the y-axis coordinate of a point 712 on the glyph. In some cases, the region-determining engine 506 can identify points 712 and 714 by searching and/or sorting the set of coordinates defining the outline of the glyph 701 to identify minimum and maximum values within the coordinates. The region-determining engine 506 can determine the coordinates of points 706, 708, and 710 in a similar manner. As shown in FIG. 7, bounds 705, 707, 709, and 711 may be defined by the coordinates of points 704, 706, 708, and 710. For example, the left horizontal bound 705 may correspond to a vertical line extending from the y-axis coordinate of point 708 to the y-axis coordinate of point 704 through the x-axis coordinate of point 708 (which is the same as the x-axis coordinate of point 704). As another example, the upper vertical bound 707 may correspond to a horizontal line extending from the x-axis coordinate of point 704 to the x-axis coordinate of point 706 through the y-axis coordinate of point 704 (which is the same as the y-axis coordinate of point 706).

After determining the bounding box 702 of the selected glyph 502, the highlight engine 508 can display the highlighted region 510 by highlighting, within the user interface, a region corresponding to the bounding box 702. The phrase "highlighting a region," as used herein, can refer to altering the appearance of the region to visually emphasize or indicate a glyph located within the region. In one example, highlighting a region involves changing the color of all or a portion of the region. Specifically, highlighting a region can involve setting the color value of pixels within the region as a predetermined highlight color value. Alternatively, highlighting a region can involve adjusting the color value of pixels within the region via a blending function or screen-blending mode. The highlight engine 508 can facilitate or perform highlighting via a variety of mechanisms, such as by directing a graphics port (or a similar function or program) to implement a highlighting mechanism within a determined region. For instance, the highlight engine 508 can pass, to the graphics port, the x-axis and y-axis coordinates defining the bounding box 702, as well as a command to highlight a region corresponding to the coordinates within the user interface.

Figure 8A:
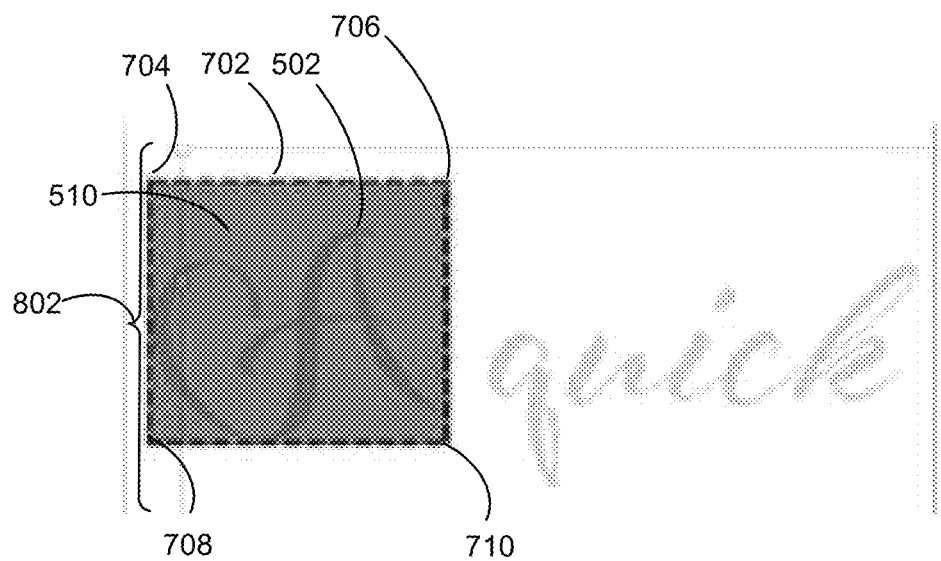
FIG. 8A, FIG. 8B, FIG. 8C, FIG. 8D, FIG. 8E, and FIG. 8F are illustrations of examples of rectangular highlights generated by a glyph-aware glyph selection system, in accordance with some examples provided herein.

FIG. 8A illustrates an example of the highlighted region 510. In this example, the highlight engine 508 can display the highlighted region 510 by applying a blending function to the entirety of the bounding box 702 (e.g., each pixel within the bounding box 702). In other examples, the highlight engine 508 can display the highlighted region 510 by changing the appearance of a portion of the bounding box 702. In one illustrative example, the highlight engine 508 can highlight a border that surrounds the bounding box. In this example, an inner perimeter of the border may be defined by the perimeter of the bounding box.

FIG. 8A includes a waxline 802 (e.g., corresponding to the waxline 402 in FIG. 4). As shown in FIG. 8A, the bounds of the bounding box 702 (and therefore the bounds of the highlighted region 510) do not exceed and are not defined by the bounds of the waxline 802. For instance, the highlighted region 510 may be defined by the points 704, 706, 708, and 710. As noted above, the coordinates of these points correspond to the minimum and maximum x-axis and y-axis coordinates of the bounding box 702 of the selected glyph 502. Thus, in contrast to some glyph selection approaches, the bounding box approach implemented by the glyph selection system 500 displays highlighted regions that are independent of glyph waxlines, resulting in both increased accuracy and decreased ambiguity of the highlighted regions.

In some cases, the glyph selection system 500 detects that the user selects an additional glyph within the user interface after selecting the selected glyph 502 and while the selected glyph 502 is still selected. For example, the detection engine 504 may determine that the user is moving a text cursor along a line of text while pressing one button of a mouse, resulting in one or more glyphs adjacent to the selected glyph 502 being selected. The glyph selection system 500 can update highlighted region 510 in response to detecting that the additional glyph is selected. For example, the glyph selection system 500 can determine an additional region within the user interface that encompasses the additional glyph and then display (e.g., highlight) the additional region within the user interface.

Figure 8B:
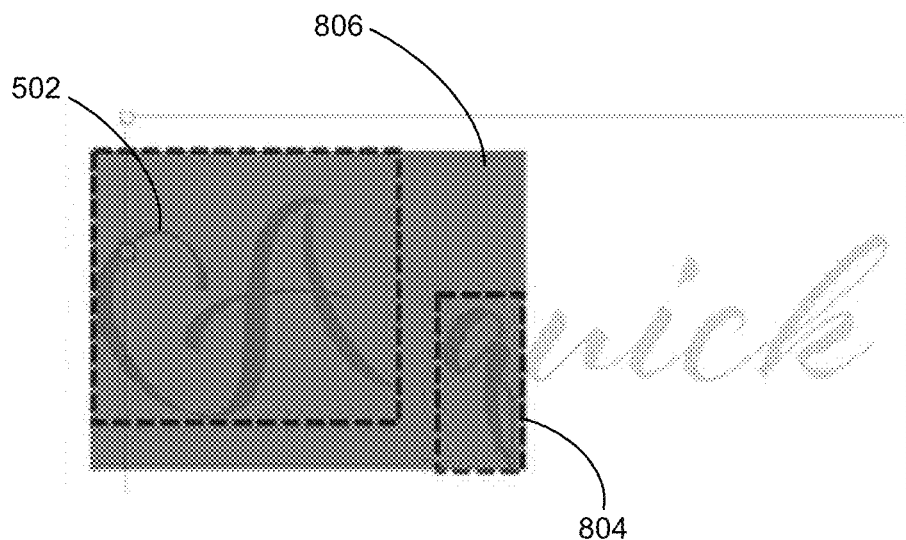
Figure 8C:
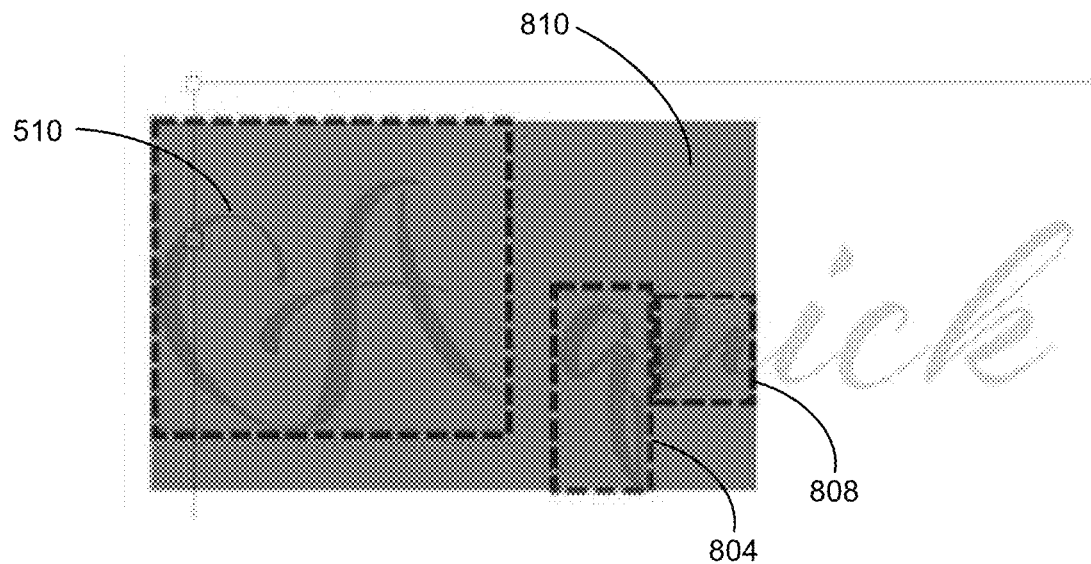

FIG. 8B and FIG. 8C illustrate examples of updating the highlighted region 510 in response to detecting a newly selected glyph. In these examples, the detection engine 504 can detect that the user selects a selected glyph 804 while the selected glyph 502 is still selected. In response to this detection, the region-determining engine 506 can determine a bounding box of the selected glyph 804. For example, the region-determining engine 506 can determine coordinates defining and/or corresponding to the vertical and horizontal bounds of the selected glyph 804.

In some cases, the glyph selection system 500 can update the highlighted region 510 based solely on the bounding box of the selected glyph 804. For example, the glyph selection system 500 can define the additional region to be highlighted as the bounding box of the selected glyph 804. In other cases, the region-determining engine 506 can determine the additional region to be highlighted based on both the bounding box of the selected glyph 804 and the current bounds of the highlighted region 510. In this way, the glyph selection system 500 can display rectangular highlighted regions that completely encompass multiple glyphs.

To generate a rectangular highlighted region that encompasses both the selected glyph 502 and the selected glyph 804, the region-determining engine 506 can set the horizontal bounds of the additional region encompassing the selected glyph 804 to match or correspond to the horizontal bounds of the bounding box of the selected glyph 804. In addition, the region-determining engine 506 can determine the vertical bounds of the additional region based on whether the vertical range of the highlighted region 510 extends beyond the vertical range of the selected glyph 804. As used herein, the term "vertical range of a region" can refer to or represent an inclusive range of y-axis coordinates within the region. If the vertical range of the highlighted region 510 extends beyond the vertical range of the selected glyph 804, the region-determining engine 506 can set the vertical bounds of the additional region as the vertical bounds of the highlighted region 510. As an example, the vertical range of the highlighted region 510 extends beyond the vertical range of the selected glyph 804 if the vertical range of the highlighted region 510 includes a y-axis coordinate with a higher value than the maximum y-axis coordinate within the vertical range of the selected glyph 804. If the vertical range of the highlighted region 510 does not extend beyond the vertical range of the bounding box of the selected glyph 804, the region-determining engine 506 can set the vertical bounds of the additional region as the vertical bounds of the selected glyph 804. In addition, the region-determining engine 506 can update (e.g., extend) the vertical bounds of the highlighted region 510 to match or correspond to the vertical bounds of the bounding box. As an example, FIG. 8B illustrates an updated highlighted region 806 that corresponds to a rectangle encompassing both the selected glyph 502 and the selected glyph 804.

In the example of FIG. 8B, the selected glyph 804 is separated from the selected glyph 502 by a whitespace character (e.g., a character with no visible components). In some cases, the glyph selection system 500 can detect that the user has selected the whitespace character before detecting that the user has selected the selected glyph 804. In one example, the glyph selection system 500 can determine to not update the highlighted region 510 to encompass the whitespace character prior to detecting that the user selects the selected glyph 804. For example, the glyph selection system 500 may determine that such an update is unnecessary because the whitespace character is not visible. In other cases, the glyph selection system 500 may update highlighted region 510 to encompass the whitespace character even if the user has not yet selected the selected glyph 804. In a further example, the glyph selection system 500 can determine to not encompass the whitespace character within a highlighted region even if the glyphs on either side of the whitespace character are selected.

FIG. 8C includes a selected glyph 808. In one example, the selected glyph 808 represents a glyph that is adjacent to the selected glyph 804 and is selected by the user while the selected glyph 502 and the selected glyph 804 are still selected. As illustrated by FIG. 8C, the glyph selection system 500 can extend the updated highlighted region 806 in FIG. 8B (resulting in an updated highlighted region 810) to encompass the selected glyph 808. In one example, the horizontal bounds of the additional region included within the updated highlighted region 810 correspond to the horizontal bounds of the selected glyph 808. In addition, because the vertical bounds of the selected glyph 808 do not extend beyond the vertical bounds of updated highlighted region 806, the vertical bounds of updated highlighted region 810 correspond directly to the vertical bounds of the updated highlighted region 806.

Figure 8D:
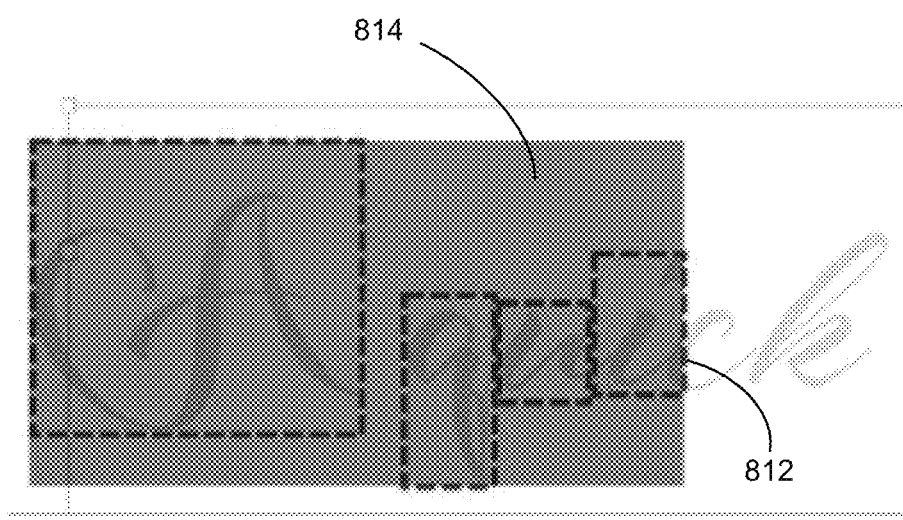
Figure 8E:
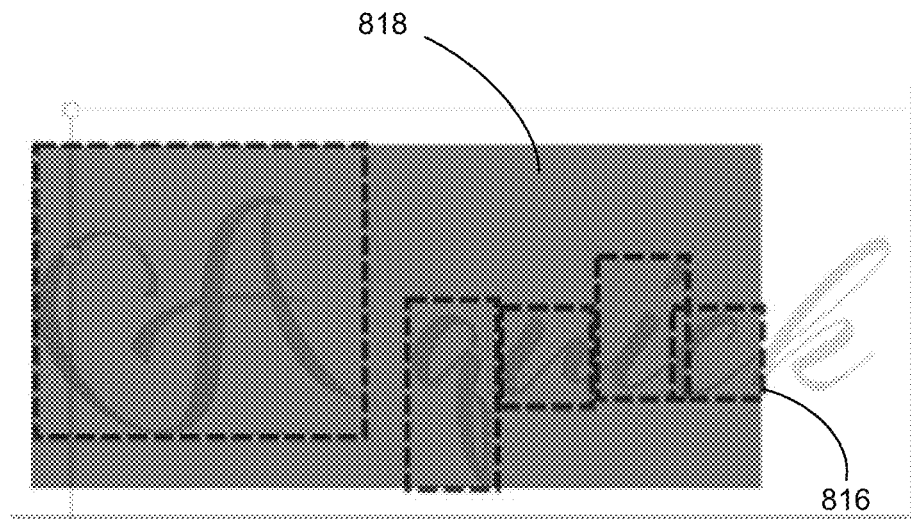
Figure 8F:
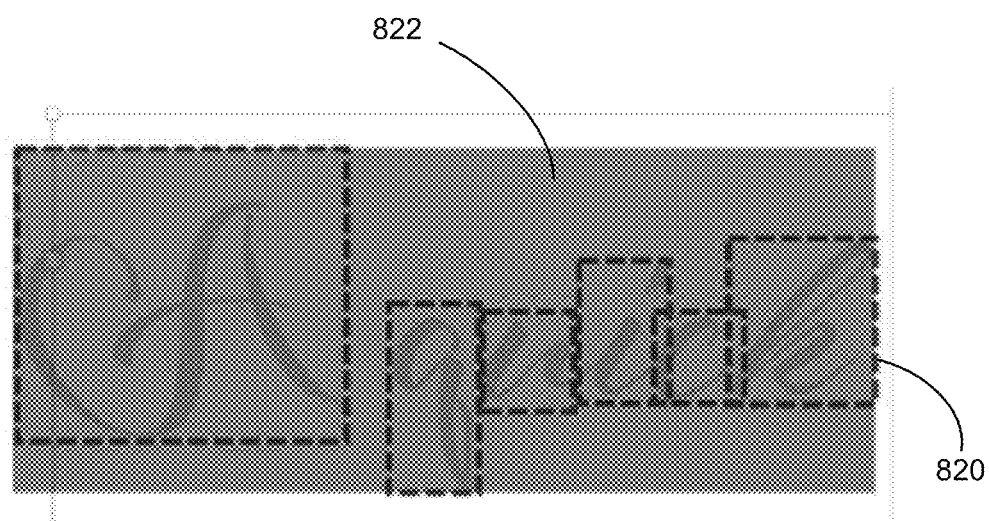

FIG. 8D, FIG. 8E, and FIG. 8F illustrate further examples of extending a rectangular highlighted region within a user interface. Specifically, FIG. 8D illustrates an updated highlighted region 814 that encompasses a selected glyph 812. FIG. 8E illustrates an updated highlighted region 818 that encompasses a selected glyph 816. In addition, FIG. 8F includes an updated highlighted region 822 that encompasses a selected glyph 820. In some cases, these highlighted regions correspond to the minimum rectangular area required to encompass each selected glyph within a set of selected glyphs. For example, the highlighted regions do not extend beyond the bounding boxes of each selected glyph more than is necessary to account for discrepancies between the vertical ranges of the glyphs.

The glyph selection system 500 can implement the bounding box approach in any additional or alternative manner. For instance, the glyph selection system 500 can generate highlighted regions with rounded corners (as opposed to perpendicular corners). In another example, the glyph selection system 500 can generate highlighted regions that extend beyond the bounding box of a selected glyph (e.g., in order to more clearly or obviously highlight the glyph). In general, the glyph selection system 500 can implement any type or form of glyph selection solution at least partially based on the bounding boxes of selected glyphs.

FIG. 9, FIG. 10A, FIG. 10B, and FIG. 10C illustrate the process by which the glyph selection system 500 can perform the glyph outline approach. In the glyph outline approach, the region-determining engine 506 can define a region to be highlighted as a border that encompasses and/or follows the outline of the selected glyph 502. For example, after obtaining a set of coordinates that corresponds to the selected glyph 502 (e.g., by querying a server that stores information about glyphs provided by an application, as discussed above), the region-determining engine 506 can generate a path (e.g., a set of lines and/or curves) that defines the outline of the selected glyph 502. In some cases, the path follows or indicates each edge and/or contour of the selected glyph 502.

The region-determining engine 506 can generate the path that defines the outline of the selected glyph 502 in a variety of ways. In some cases, the region-determining engine 506 can fit one or more equations to the coordinates corresponding to the outline. For example, the region-determining engine 506 can interpolate the coordinates as Bezier curves or other parametric curves. A Bezier curve refers to a parametric curve used to model smooth curves. A Bezier curve can include one or more Bezier segments, where each Bezier segment is defined by multiple points (e.g., a start point, an end point, and optionally one or more additional control points). In some examples, a Bezier curve can include Bezier segments defined for any degree (e.g., linear, quadratic, cubic, etc.). While Bezier segments and curves are used herein as examples of paths defining the outlines of glyphs, glyph selection system 500 may additionally or alternatively use other forms of parametric segments and curves, such as Hermite curves, B-splines, non-uniform rational basis splines, Kappa-curves, Catmull-Rom splines, and the like.

Figure 9:
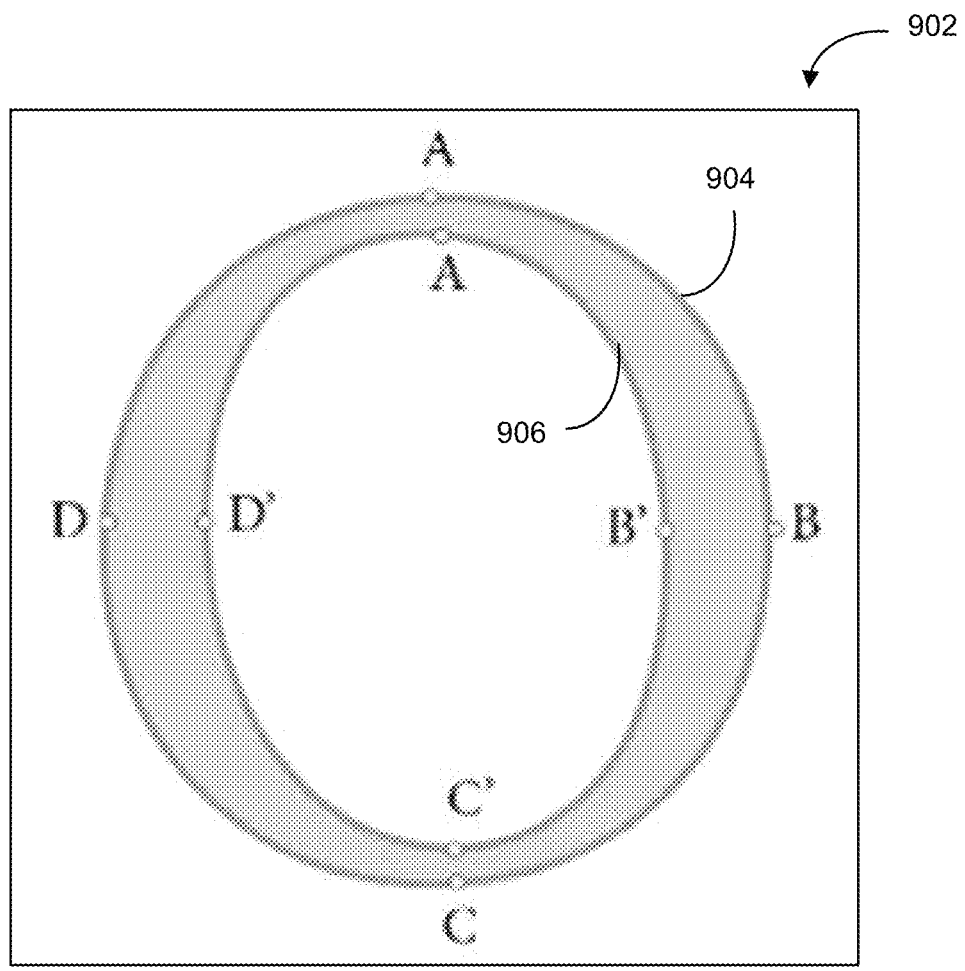
FIG. 9 is an illustration of an example of a Bézier path, in accordance with some examples provided herein.

FIG. 9 illustrates an example path 902 corresponding to the outline of one embodiment of the selected glyph 502. In this example, the selected glyph 502 corresponds to the letter "o". As shown in FIG. 9, the outline of the selected glyph 502 can be represented by two closed strokes, a stroke 904 defined by the points A, B, C, and D, and a stroke 906 defined by the points A', B', C', and D'. In some cases, the region-determining engine 506 can generate a path that defines the outline of the selected glyph 502 by fitting one parametric curve (e.g., a Bezier curve) to the points within the stroke 904 and another parametric curve to the points within the stroke 906. The region-determining engine 506 can represent, define, and/or approximate the outline with any additional or alternative curve fitting technique or mechanism.

Once the region-determining engine 506 generates the path defining the outline of the selected glyph 502, the region-determining engine 506 can determine a region corresponding to an extended outline of the selected glyph 502. For example, at least a portion of this region can be bound by an inner perimeter and an outer perimeter. The inner perimeter can correspond to the path defining the outline of the selected glyph 502 and the outer perimeter can be offset from the inner perimeter by an offset value. In other words, the region can represent a border that follows and/or encompasses the outline of the selected glyph 502. In some cases, the offset value of the extended outline can correspond to a weight (e.g., a stroke weight). For instance, a graphics port may render or adjust the weight (e.g., width, height, and/or thickness) of strokes within a glyph based on a point size that corresponds to a distance (e.g., 0.2 inches, 0.5 inches, 0.8 inches, etc.) within a user interface. In some cases, the glyph selection system 500 can utilize this capability of the graphics port to generate extended outlines with various widths. For instance, the glyph selection system 500 can direct the graphics port to highlight, within the user interface, a region that extends from the outline of the selected glyph 502 by a distance corresponding to a point value. In some cases, the point value may be a standard or predetermined value. Alternatively, the point value can be provided or selected by the user. For example, the region-determining engine 506 can provide a mechanism (e.g., a menu, pop-up window, or additional user interface) that enables the user to input a desired point value.

In some cases, the region encompassing the selected glyph 502 may include two or more separate regions. For instance, if the selected glyph 502 includes a closed stroke or other enclosed area, the extended outline can include an external outline and an internal outline. As an example, an extended outline of the selected glyph 502 illustrated in FIG. 9 can include an external outline extending from the stroke 904 and an inner outline extending from the stroke 906. In this example, the extended outline may exclude the selected glyph 502. In other examples, the region-determining engine 506 may include all or a portion of the selected glyph 502 within the extended outline After determining the region corresponding to the extended outline of the selected glyph 502, the region-determining engine 506 can direct the highlight engine 508 to display the highlighted region 510 by highlighting the region within the user interface. In one example, the highlight engine 508 can display the highlighted region 510 by setting the color value of all or a portion of the pixels within the extended outline as the same color value. Alternatively, the highlight engine 508 can display the highlighted region 510 by inverting or otherwise altering the color values of the pixels within the extended outline. In some cases, the highlight engine 508 can facilitate displaying the highlighted region 510 by passing, to the graphics port, the path defining the outline of the selected glyph 502 and a parameter indicating the offset value.

Figure 10A:
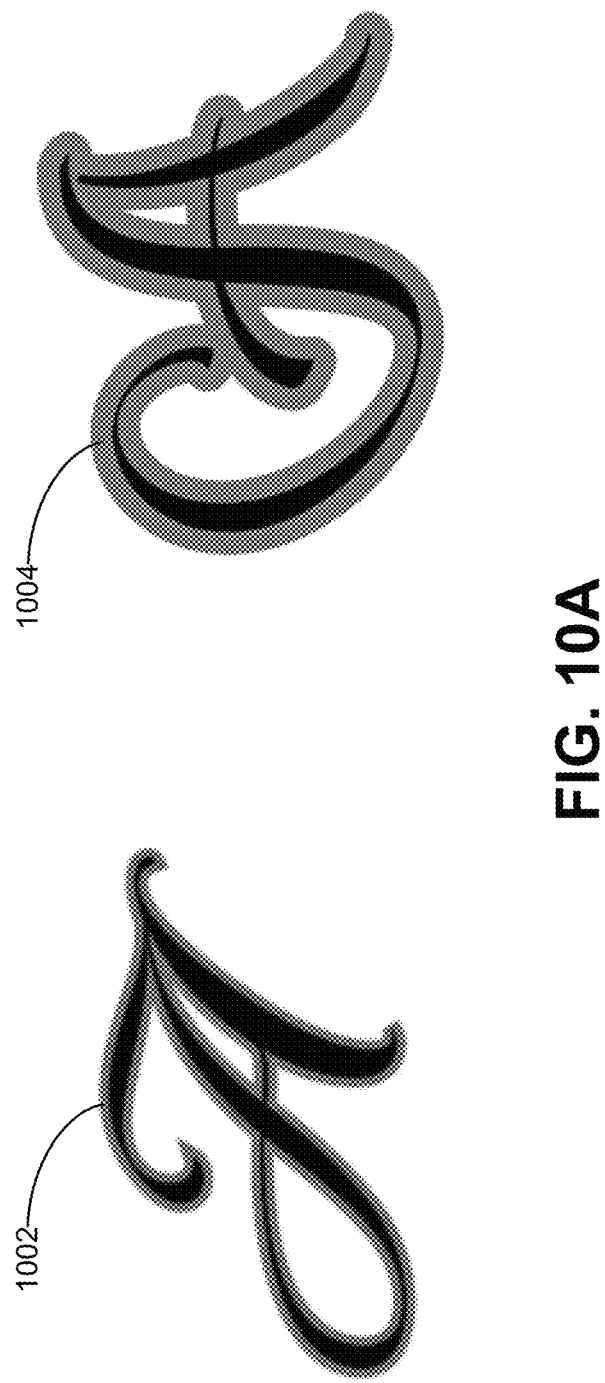
FIG. 10A, FIG. 10B, and FIG. 10C are illustrations of examples of non-rectangular highlights generated by a glyph-aware glyph selection system, in accordance with some examples provided herein.
Figure 10B:
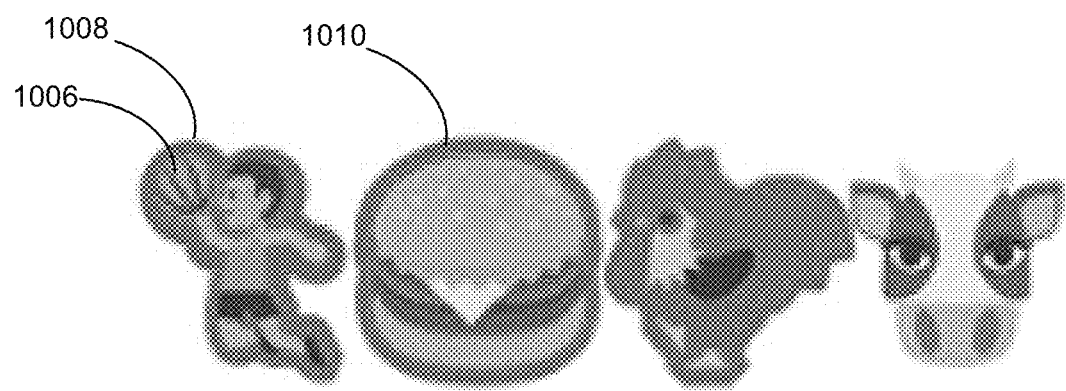
Figure 10C:

FIG. 10A, FIG. 10B, and FIG. 10C illustrate various embodiments of the highlighted region 510 that have been determined and displayed using the disclosed glyph outline approach. FIG. 10A includes a highlighted region 1002 and a highlighted region 1004 that represent two different extended outlines encompassing the same glyph. This example illustrates how the offset value used to determine an extended outline affects the appearance of the extended outline. For example, the highlighted region 1004 was determined using a higher offset value than the highlighted region 1002, and therefore appears thicker than the highlighted region 1002. FIG. 10B illustrates a highlighted region 1008 encompassing a selected glyph 1006. This example illustrates how the glyph outline approach can avoid altering the color of a selected glyph. For example, the selected glyph 1006 (an image of a person with a basketball) contains multiple colors (e.g., the basketball may be orange and the person's hair may be brown). Because the highlighted region 1008 does not extend into the selected glyph 1006, the colors of the selected glyph 1006 remain unchanged after the glyph has been selected.

In some cases, the detection engine 504 may detect one or more additional glyphs selected by the user after the highlight engine 508 displays the highlighted region 510. In these cases, the region-determining engine 506 and the highlight engine 508 can update the highlighted region 510 to account for the additional glyph. For example, the region-determining engine 506 can determine an additional extended outline corresponding to the additional glyph and then the highlight engine 508 can display the additional extended outline within the user interface. In some cases, the highlighted region 510 may be separate (e.g., disconnected) from the highlighted region encompassing the additional selected glyph. A highlighted region 1010 in FIG. 10B represents an example of displaying separate extended outlines within a user interface. Alternatively, the glyph selection system 500 can update (e.g., extend) the highlighted region 510 such that the highlighted region 510 encompasses both the selected glyph 502 and the additional selected glyph. For example, the glyph selection system 500 can extend the highlighted region 510 if the adjacent glyph touches and/or is connected to the selected glyph 502 (e.g., if the glyphs represent letters written in a cursive font). As an example of extending the highlighted region 510 to encompass multiple glyphs, FIG. 10C illustrates a highlighted region 1012 that encompasses each glyph (e.g., all four glyphs) within a selected glyph set 1014.

Figure 11:
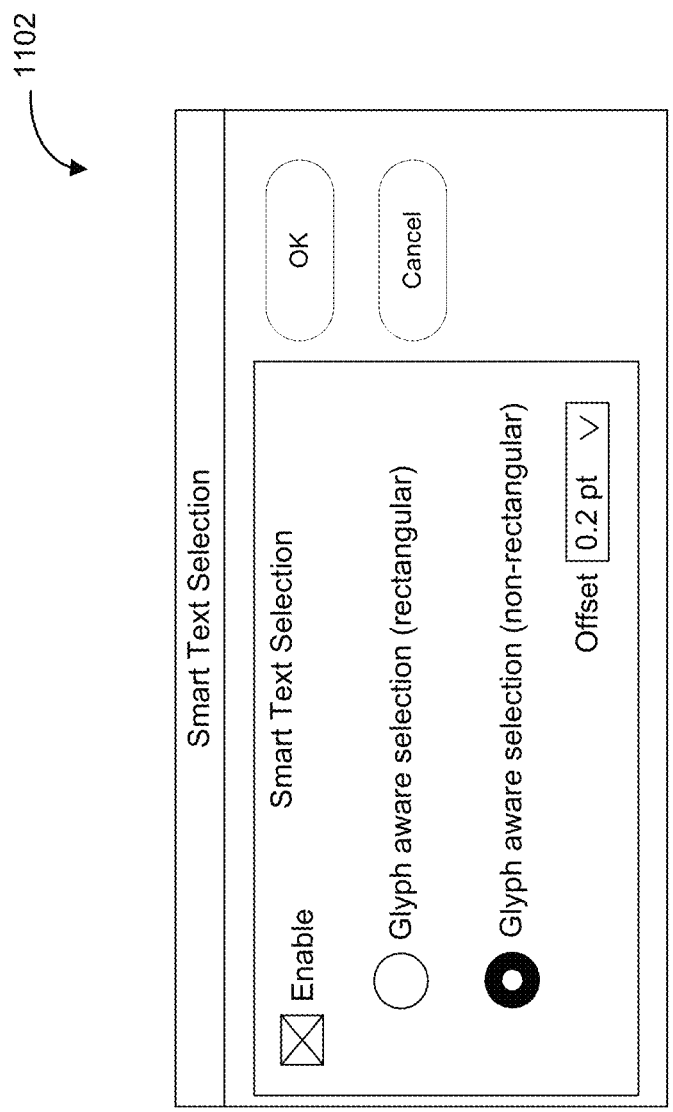
FIG. 11 is an illustration of graphical user interface via which a user can select a glyph-aware glyph selection approach, in accordance with some examples provided herein.

As noted above, the glyph selection system 500 can provide a mechanism (e.g., a menu, pop-up window, or user interface) that enables the user to select a glyph selection approach to be implemented within an application. FIG. 11 illustrates a menu 1102 that represents one example of this mechanism. As shown in FIG. 11, the menu 1102 allows the user to enable "smart text selection." "Smart text selection" can refer to the glyph-aware selection approaches disclosed herein (rather than other glyph selection approaches, such as waxline-based glyph selection). Menu 1102 also allows the user to select the particular text/glyph selection approach to be implemented. In this example, the rectangular selection scheme corresponds to the bounding box approach and the non-rectangular selection scheme corresponds to the glyph outline approach.

If the user selects the non-rectangular approach, menu 1102 allows the user to select the offset value of the extended outline. For example, the menu 1102 can include a drop-down list of the various offset values (e.g., a set of points between 0.01 points and 0.30 points) supported by the application. As an example, the highlighted region 1002 representing an extended outline in FIG. 10A may correspond to an offset value of 0.05 points, and the highlighted region 1004 in FIG. 10A may correspond to an offset value of 0.20 points. Menu 1102 may include any additional or alternative element and/or user input mechanism that enables the user to customize and/or configure a glyph selection approach.

Figure 12:
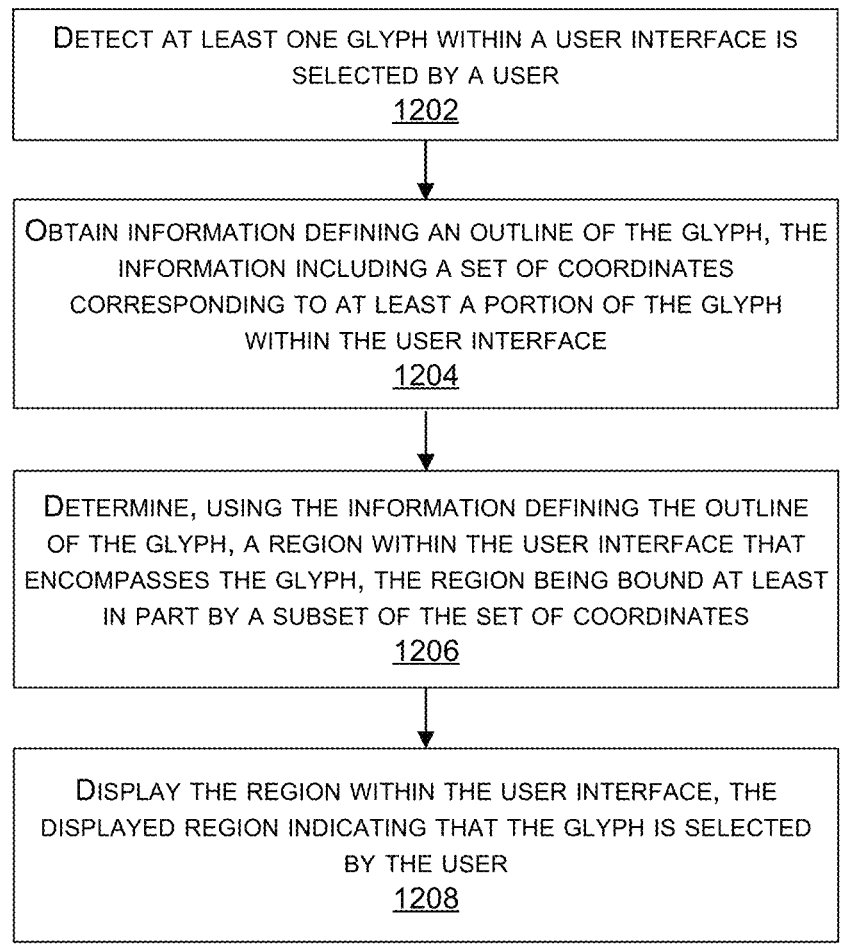
FIG. 12 is a flowchart illustrating an example of a process of glyph-aware text selection, in accordance with some examples provided herein.

An example of a process performed using the techniques described herein will now be described. FIG. 12 is a flowchart illustrating an example of a process 1200 for glyph-aware text selection. At block 1202, the process 1200 includes detecting at least one glyph within a user interface is selected by a user. For instance, the process 1200 can include monitoring a user interface displayed by an application to detect when the user selects the glyph (e.g., by clicking on the glyph or by dragging a text cursor over the glyph). In some cases, the process 1200 can proceed to block 1204 after detecting a single glyph selected by the user. For example, the process 1200 can be performed in response to each glyph selected by the user.

At block 1204, the process 1200 includes obtaining information defining an outline of the glyph, the information including a set of coordinates corresponding to at least a portion of the glyph within the user interface. The information defining the outline of the glyph can be obtained by first determining a glyph identifier of the glyph and/or attributes of the glyph (such as formatting options applied to the glyph and/or the layout of the glyph within the user interface). In some cases, this information can be determined by accessing a model (e.g., an object-oriented model) that stores attributes of glyphs currently displayed in the user interface. Based on the information, a server that stores information about glyphs supported by the application can determine coordinates that correspond to the precise position and/or orientation of the glyph within the user interface. For example, the server can transform coordinates corresponding to the glyph identifier based on the attributes of the glyph. Thus, the coordinates may define the outline of the glyph as the glyph is displayed in the user interface. In one example, the server may be external to (e.g., remote from) a client device that runs the application. Alternatively, the server may represent a database or portion of memory included within the application and/or the client device.

At block 1206, the process 1200 includes determining, using the information defining the outline of the glyph, a region within the user interface that encompasses the glyph, the region being bound at least in part by a subset of the set of coordinates. This region can be determined based on the glyph-aware text selection approach (e.g., either the bounding box approach or the glyph outline approach) currently implemented within the application. When the bounding box approach is implemented, the process 1200 can include determining from the set of coordinates defining the outline of the glyph, horizontal and vertical bounds of the glyph within the user interface, where the vertical bounds of the glyph correspond to a vertical maximum within the set of coordinates and a vertical minimum within the set of coordinates, and where the horizontal bounds of the glyph correspond to a horizontal maximum within the set of coordinates and a horizontal minimum within the set of coordinates. The process 1200 can then include determining, within the user interface, a region at least partially defined by the horizontal and vertical bounds of the glyph. In some cases, this region may correspond to a bounding box of the glyph. For instance, the bounding box may be a rectangle defined by the maximum and minimum x-axis and y-axis coordinates of the glyph.

When the glyph outline approach is implemented, the process 1200 can include generating, based on the set of coordinates, a path corresponding to the outline of the glyph within the user interface. In one illustrative example, the path may include a Bezier curve or other parametric curve that defines the outline of the glyph. This path may be fitted to and/or correspond to all or a portion of the contours (e.g., edges) of the glyph. In some cases, the process 1200 can include determining a region corresponding to an extended outline of the glyph, where an inner perimeter of the region is defined by the path corresponding to the outline of the glyph and an outer perimeter of the region is offset from the inner perimeter by an offset value. In other words, the region that encompasses the glyph can be determined as a border that follows and/or encompasses the outline of the glyph. The offset value of the extended outline can correspond to a variety of widths or thicknesses.

In some cases, the region corresponding to the extended outline does not include the glyph. In some cases, the bounding box and/or the path can be generated by the server that stores the coordinates of the glyph. For example, a processing device on the server can determine the bounding box and/or the path and then return this information to the client device. The client device can then use this information to determine the region encompassing the glyph within the user interface.

At block 1208, the process 1200 includes displaying the region within the user interface, the displayed region indicating that the glyph is selected by the user. In some cases, displaying the region within the user interface can include highlighting or otherwise adjusting the color of content within the region. For instance, displaying the region can include setting the color value of pixels within the region as a predetermined highlight color value. In other cases, displaying the region can include highlighting content within the region using a blending function or similar highlighting mechanism. When the glyph outline approach is implemented, displaying the region within the user interface can include retaining the original appearance (e.g., color) of the glyph, because the glyph may not be included within the region corresponding to the extended outline.

In some cases, the process 1200 can include determining that the user selects an additional glyph while the first glyph is still selected. In these cases, the process 1200 can include updating the highlighted region and/or displaying an additional highlighted region to encompass the additional glyph within the user interface. For instance, when the bounding box approach is implemented, the process 1200 can include determining and highlighting a region corresponding to a bounding box of the additional glyph. In some cases, the process 1200 can include adjusting and/or extending the region encompassing the first glyph and/or the region encompassing the additional glyph such that the entire highlighted portion of the user interface corresponds to a rectangle (rather than a series of differently sized and/or disconnected boxes). When the glyph outline approach is implemented, the process 1200 can include determining and highlighting a region corresponding to an extended outline of the additional glyph. This region can be connected to the region encompassing the first glyph, or the region can be separate.

The process 1200 can include determining that the user is no longer selecting the glyph. For instance, the process 1200 can include determining that the user has clicked on an area within the user interface that does not correspond to the glyph. In response to this determination, the process 1200 can include removing the displayed region from the user interface. In some cases, removing the displayed region from the user interface can include restoring content within the region to its original state or appearance (e.g., by reverting the pixel color values of the pixels within the displayed region to their original values). In addition, the process 1200 can include continuing to monitor the user interface to detect additional glyphs selected by the user, at which point the process 1200 can repeat.

Figure 14:
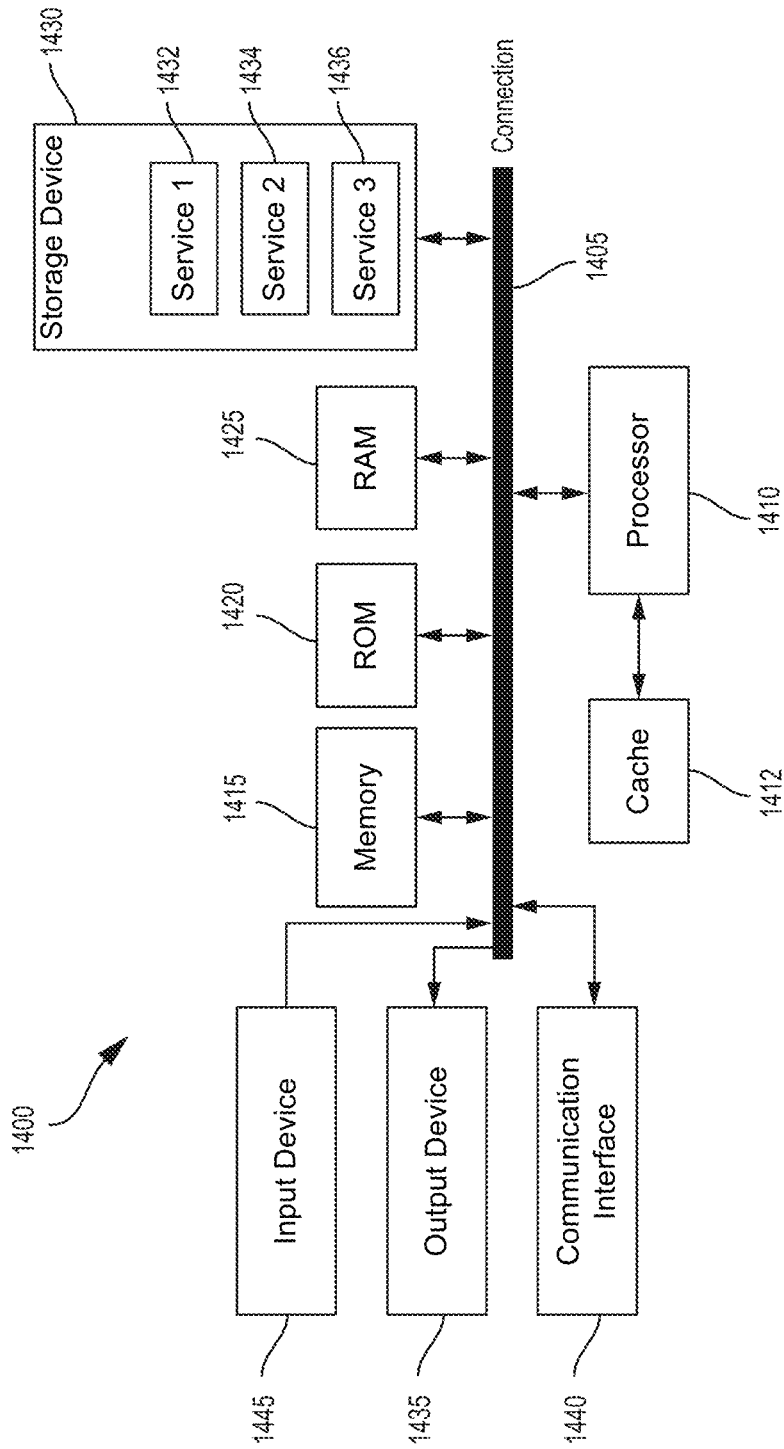
FIG. 14 is an example computing device architecture of an example computing device that can implement the various techniques described herein.

In some examples, the processes described herein (e.g., the process 1200 or other process described herein) may be performed by a computing device or apparatus, such as a computing device having the computing device architecture 1400 shown in FIG. 14. In one example, the process 1200 can be performed by a computing device with the computing device architecture 1400 implementing the glyph selection system 500 and/or the glyph selection system 600. The computing device can include any suitable device, such as a mobile device (e.g., a mobile phone), a desktop computing device, a tablet computing device, a wearable device, a server (e.g., in a software as a service (SaaS) system or other server-based system), and/or any other computing device with the resource capabilities to perform the processes described herein, including the process 1200. In some cases, the computing device or apparatus may include various components, such as one or more input devices, one or more output devices, one or more processors, one or more microprocessors, one or more microcomputers, and/or other component that is configured to carry out the steps of processes described herein. In some examples, the computing device may include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1200 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
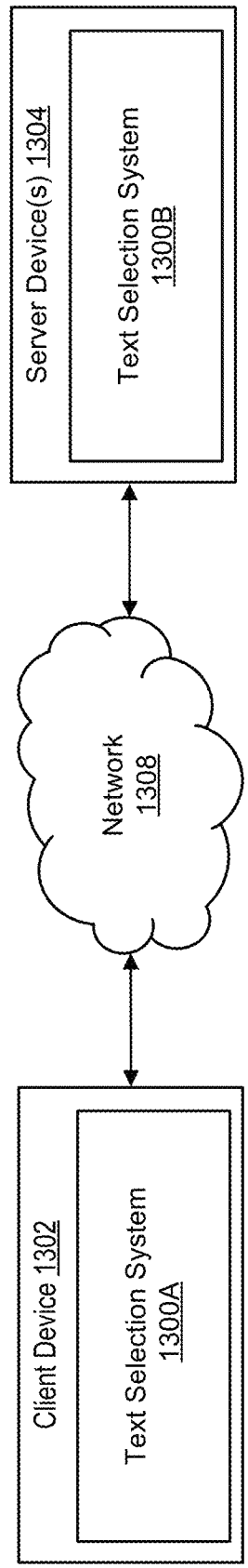
FIG. 13 is a diagram illustrating an example of an environment in which a glyph-aware text selection system can be implemented, in accordance with some examples provided herein.

FIG. 13 illustrates a schematic diagram of an environment 1300 in which the glyph selection system 500 and/or the glyph selection system 600 can be implemented in accordance with one or more examples. In some examples, the environment 1300 includes various computing devices including a client device 1302 and one or more server devices 1304. The environment 1300 also includes a network 1308. The network 1308 may be any suitable network over which the computing devices can communicate, including any wired or wireless network.

As illustrated in FIG. 13, the environment 1300 includes the client device 1302. The client device 1302 may comprise any computing device, such as the computing device described below in relation to FIG. 14. As shown, the client device includes a glyph selection system 1300A, which may correspond to an embodiment of glyph selection system 500 and/or glyph selection system 600. For example, the glyph selection system 1300A can detect that a user selects one or more glyphs within a user interface and then facilitate determining and/or highlighting a region encompassing the glyphs in accordance with either the bounding box glyph selection approach or the extended outline glyph selection approach.

In addition, the environment 1300 includes the one or more server devices 1304, which may comprise any computing device, such as one or more of the computing devices described below in relation to FIG. 14. The one or more server devices 1304 can generate, store, receive, and transmit any type of data, including a coordinates and/or attributes corresponding to and/or defining a set of glyphs, among other data. As shown, the one or more server devices 1304 can include a glyph selection system 1300B that can communicate with the glyph selection system 1300A on the client device 1302. For example, the glyph selection system 1300B can transmit information describing bounding boxes and/or paths (e.g., parametric curves) corresponding to glyphs and/or other information to the client device 1302, which enables the client device 1302 to determine regions to be highlighted within a user interface. While only a single server device is shown, the one or more servers devices 1304 can be implemented across multiple server devices.

While not illustrated, in one or more embodiments, the client device 1302 and/or the one or more server devices 1304 can also include all components, or a portion of the components, of the glyph selection system 500 and/or the glyph selection system 600. For example, when located in the one or more server devices 1304, the glyph selection system 1300B can comprise an application running on the one or more server devices 1304 or a portion of a software application that can be downloaded to the client device 1302. For instance, glyph selection system 1300B can include a web hosting application allowing the client device 1302 to interact with content from the glyph selection system 1300B hosted on the one or more server devices 1304. In this manner, the one or more server devices 1304 can process information about selected glyphs based on user interaction within a graphical user interface provided to the client device 1302.

Although FIG. 13 illustrates a particular arrangement of the one or more server devices 1304, the client device 1302, and the network 1308, various additional arrangements are possible. For example, while FIG. 13 illustrates the one or more client device 1302 communicating with the one or more server devices 1304 via the network 1308, in one or more embodiments a single client device may communicate directly with the one or more server devices 1304, bypassing the network 1308.

Similarly, although the environment 1300 of FIG. 13 is depicted as having various components, the environment 1300 may have additional or alternative components. For example, the glyph selection system 1300A and/or the glyph selection system 1300B can be implemented on multiple computing devices. For instance, the glyph selection system 500 may be implemented in whole by the one or more server devices 1304 or the glyph selection system 500 may be implemented in whole by the client device 1302. Alternatively, the glyph selection system 500 may be implemented across multiple devices or components (e.g., utilizing the one or more server devices 1304 and the one or more client device 1302).

FIG. 14 illustrates an example computing device architecture 1400 of an example computing device which can implement the various techniques described herein. For example, the computing device architecture 1400 can implement the glyph selection system 500 shown in FIG. 3 and/or the glyph selection system 600 shown in FIG. 6. The components of computing device architecture 1400 are shown in electrical communication with each other using connection 1405, such as a bus. The example computing device architecture 1400 includes a processing unit (CPU or processor) 1410 and computing device connection 1405 that couples various computing device components including computing device memory 1415, such as read only memory (ROM) 1420 and random access memory (RAM) 1425, to processor 1410.

Computing device architecture 1400 can include a cache of high-speed memory connected directly with, in close proximity to, or integrated as part of processor 1410. Computing device architecture 1400 can copy data from memory 1415 and/or the storage device 1430 to cache 1412 for quick access by processor 1410. In this way, the cache can provide a performance boost that avoids processor 1410 delays while waiting for data. These and other modules can control or be configured to control processor 1410 to perform various actions. Other computing device memory 1415 may be available for use as well. Memory 1415 can include multiple different types of memory with different performance characteristics. Processor 1410 can include any general purpose processor and a hardware or software service, such as service 1 1432, service 2 1434, and service 3 1436 stored in storage device 1430, configured to control processor 1410 as well as a special-purpose processor where software instructions are incorporated into the processor design. Processor 1410 may be a self-contained system, containing multiple cores or processors, a bus, memory controller, cache, etc. A multi-core processor may be symmetric or asymmetric.

To enable user interaction with the computing device architecture 1400, input device 1445 can represent any number of input mechanisms, such as a microphone for speech, a touch-sensitive screen for gesture or graphical input, keyboard, mouse, motion input, speech and so forth. Output device 1435 can also be one or more of a number of output mechanisms known to those of skill in the art, such as a display, projector, television, speaker device, etc. In some instances, multimodal computing devices can enable a user to provide multiple types of input to communicate with computing device architecture 1400. Communication interface 1440 can generally govern and manage the user input and computing device output. There is no restriction on operating on any particular hardware arrangement and therefore the basic features here may easily be substituted for improved hardware or firmware arrangements as they are developed.

Storage device 1430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1425, read only memory (ROM) 1420, and hybrids thereof. Storage device 1430 can include services 1432, 1434, 1436 for controlling processor 1410. Other hardware or software modules are contemplated. Storage device 1430 can be connected to the computing device connection 1405. In one aspect, a hardware module that performs a particular function can include the software component stored in a computer-readable medium in connection with the necessary hardware components, such as processor 1410, connection 1405, output device 1435, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit bypassing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method for highlighting selected portions of text, comprising:
    detecting at least one glyph within a user interface is selected by a user;
    obtaining information defining an outline of a first glyph, the information including a set of coordinates corresponding to at least a portion of the first glyph within the user interface;
    determining, from the set of coordinates defining the outline of the first glyph, horizontal bounds and vertical bounds of the first glyph within the user interface, wherein the vertical bounds of the first glyph correspond to a vertical maximum within the set of coordinates and a vertical minimum within the set of coordinates, and wherein the horizontal bounds of the first glyph correspond to a horizontal maximum within the set of coordinates and a horizontal minimum within the set of coordinates;
    determining, within the user interface, a region at least partially defined by the horizontal bounds and vertical bounds of the first glyph,
    detecting that a second glyph within the user interface is selected by the user;
    updating, within the user interface, the region to include a vertical range of coordinates defined by the first glyph and the second glyph, and wherein the region includes a horizontal range of coordinates defined by the first glyph and the second glyph, wherein the vertical range does not extend beyond the first glyph and the second glyph; and
    displaying the region within the user interface, the displayed region indicating that the first glyph and the second glyph are selected by the user.

2. The method of claim 1, wherein the user interface is displayed by an application running on a client device, and wherein obtaining the information defining the outline of the first glyph comprises:
    querying a server external to the client device for the information defining the outline of the first glyph; and
    receiving, at the client device based on querying the server, at least a portion of the information defining the outline of the first glyph.

3. The method of claim 1, wherein displaying the region within the user interface comprises altering an appearance of content within the region.

4. The method of claim 1, further comprising:
determining that the user selects an additional glyph while the first glyph and the second glyph are still selected, the additional glyph being horizontally adjacent to the first glyph or the second glyph within the user interface;
determining horizontal bounds and vertical bounds of the additional glyph, wherein the vertical bounds of the first glyph or the second glyph exceed the vertical bounds of the additional glyph;
determining an additional region at least partially defined by the horizontal bounds and vertical bounds of the additional glyph, wherein vertical bounds of the additional region correspond to the vertical bounds of the first glyph or the second glyph; and
displaying the additional region within the user interface, the additional displayed region indicating that the additional glyph is selected by the user.

5. The method of claim 1, wherein:
the vertical bounds of the first glyph include an upper vertical bound of the first glyph corresponding to the vertical maximum within the set of coordinates and a lower vertical bound of the first glyph corresponding to the vertical minimum within the set of coordinates; and
the horizontal bounds of the first glyph include a right horizontal bound of the first glyph corresponding to the horizontal maximum within the set of coordinates and a left horizontal bound of the first glyph corresponding to the horizontal minimum within the set of coordinates.

6. A system for highlighting selected portions of text, comprising:
one or more processors; and
memory accessible to the one or more processors, the memory storing instructions, which upon execution by the one or more processors, cause the one or more processors to:
detect at least one glyph within a user interface is selected by a user;
obtain information defining an outline of a first glyph, the information including a set of coordinates corresponding to at least a portion of the first glyph within the user interface;
determine, from the set of coordinates defining the outline of the first glyph, horizontal bounds and vertical bounds of the first glyph within the user interface, wherein the vertical bounds of the first glyph correspond to a vertical maximum within the set of coordinates and a vertical minimum within the set of coordinates, and wherein the horizontal bounds of the first glyph correspond to a horizontal maximum within the set of coordinates and a horizontal minimum within the set of coordinates;
determine, within the user interface, a region at least partially defined by the horizontal bounds and vertical bounds of the first glyph;
detect that a second glyph within a user interface is selected by the user;
update, within the user interface, the region to include a vertical range of coordinates defined by the first glyph and the second glyph, and wherein the region includes a horizontal range of coordinates defined by the first glyph and the second glyph, wherein the vertical range does not extend beyond the first glyph and the second glyph; and
display the region within the user interface, the displayed region indicating that the first glyph and the second glyph are selected by the user.

7. The system of claim 6, wherein the region defined by the horizontal bounds and vertical bounds of the first glyph and the second glyph is defined by an upper vertical bound of the first glyph or the second glyph corresponding to the vertical maximum within the set of coordinates, a lower vertical bound of the first glyph or the second glyph corresponding to the vertical minimum within the set of coordinates, a right horizontal bound of the first glyph or the second glyph corresponding to the horizontal maximum within the set of coordinates, and a left horizontal bound of the first glyph or the second glyph corresponding to the horizontal minimum within the set of coordinates.

8. The system of claim 7, further comprising memory storing instructions, which upon execution by the one or more processors, cause the one or more processors to:
determine a vertical range of the region, the vertical range comprising an inclusive range of coordinates between the vertical maximum and the vertical minimum of the first glyph or the second glyph; and
determine an additional vertical range of an additional region displayed within the user interface, the additional region indicating that an additional glyph is selected by the user, and the additional glyph being horizontally adjacent to the first glyph or the second glyph within the user interface.

9. The system of claim 8, further comprising memory storing instructions, which upon execution by the one or more processors, cause the one or more processors to:
determine at least a portion of the vertical range of the region extends beyond the additional vertical range of the additional region; and
extend the additional vertical range of the additional region to encompass the vertical range of the region.

10. The system of claim 6, wherein:
the first glyph resides within a first line of text that is bound by a waxline, the waxline separating the first line of text from a second line of text displayed below the first line of text within the user interface; and
a lower vertical bound of the region is above the waxline.

11. The system of claim 6, further comprising memory storing instructions, which upon execution by the one or more processors, cause the one or more processors to alter a color of content within the region.

12. The system of claim 11, wherein altering the color of the content within the region comprises highlighting the content.

13. A non-transitory computer-readable medium having stored thereon instructions that, when executed by one or more processors, cause the one or more processors to:
detect at least one glyph within a user interface is selected by a user;
obtain a set of coordinates defining an outline of a first glyph within the user interface;
generate, based on the set of coordinates, a path corresponding to the outline of the first glyph within the user interface;
determine a region corresponding to an extended outline of the first glyph, an inner perimeter of the region being defined by the path corresponding to the outline of the first glyph and an outer perimeter of the region being offset from the inner perimeter by an offset value;
detect that a second glyph within a user interface is selected by the user;

update, within the user interface, the region to include a vertical range of coordinates defined by the first glyph and the second glyph, and wherein the region includes a horizontal range of coordinates defined by the first glyph and the second glyph, wherein the vertical range does not extend beyond the first glyph and the second glyph; and display the region within the user interface, the displayed region indicating that the first glyph and the second glyph are selected by the user.

14. The non-transitory computer-readable medium of claim 13, wherein the instructions, when executed by the one or more processors, cause the one or more processors to generate a mathematical function corresponding to the set of coordinates.

15. The non-transitory computer-readable medium of claim 14, wherein the mathematical function comprises at least one Bézier curve.

16. The non-transitory computer-readable medium of claim 13, wherein the instructions, when executed by the one or more processors, cause the one or more processors to:
  receive input from the user indicating the offset value; and
  determine the region corresponding to the extended outline of the first glyph based on the received input.

17. The non-transitory computer-readable medium of claim 13, wherein the instructions, when executed by the one or more processors, cause the one or more processors to alter a color of the extended outline within the user interface.

18. The non-transitory computer-readable medium of claim 17, wherein:
  the first glyph is an initial color prior to being selected by the user; and
  the instructions, when executed by the one or more processors, cause the one or more processors to retain the initial color of the first glyph while displaying the region within the user interface.

\* \* \* \* \*